(12) United States Patent
Noon

(10) Patent No.: US 12,373,798 B2
(45) Date of Patent: Jul. 29, 2025

(54) DETERMINING CHRONOTYPES OF USERS FOR DISPLAY WITHIN A SCHEDULING INTERFACE

(71) Applicant: Dropbox, Inc., San Francisco, CA (US)

(72) Inventor: Christopher Noon, London (GB)

(73) Assignee: Dropbox, Inc., San Francisco, CA (US)

( * ) Notice: Subject to any disclaimer, the term of this patent is extended or adjusted under 35 U.S.C. 154(b) by 367 days.

(21) Appl. No.: 18/064,510

(22) Filed: Dec. 12, 2022

(65) Prior Publication Data
US 2024/0193549 A1 Jun. 13, 2024

(51) Int. Cl.
*G06Q 10/1093* (2023.01)
(52) U.S. Cl.
CPC .................. *G06Q 10/1095* (2013.01)
(58) Field of Classification Search
CPC ....... G06Q 10/1095; G06Q 10/063114; G06Q 10/063116; G06F 16/23; G06F 3/0482; G06F 3/04842; G06F 16/248; G06F 16/22
See application file for complete search history.

(56) References Cited

U.S. PATENT DOCUMENTS

| | | | |
|---|---|---|---|
| 10,565,565 B2 | 2/2020 | Gentzkow et al. | |
| 11,141,556 B2 | 10/2021 | Jantunen | |
| 2009/0255153 A1* | 10/2009 | Mori | G09D 3/12 40/107 |
| 2017/0193459 A1 | 7/2017 | Crasso et al. | |
| 2019/0366032 A1 | 12/2019 | Lockley et al. | |
| 2020/0383487 A1 | 12/2020 | Hoyt et al. | |
| 2021/0073744 A1 | 3/2021 | Singh et al. | |
| 2021/0157978 A1* | 5/2021 | Haramati | G06F 40/177 |
| 2022/0176065 A1* | 6/2022 | Youngblood | G16H 40/40 |
| 2022/0398546 A1* | 12/2022 | Lightbody | G06F 3/0482 |

FOREIGN PATENT DOCUMENTS

WO WO-2022101810 A1 * 5/2022 .......... A61B 5/1118

OTHER PUBLICATIONS

Janböcke, S., et al. "Finding the inner clock: A chronobiology-based calendar." Extended Abstracts of the 2020 CHI Conference on Human Factors in Computing Systems <https://arxiv.org/abs/2004.06594> (Year: 2020).*

* cited by examiner

Primary Examiner — Jerry O'Connor
Assistant Examiner — Michael R Koester
(74) Attorney, Agent, or Firm — Keller Preece PLLC

(57) ABSTRACT

The present disclosure is directed toward systems, methods, and non-transitory computer-readable media for determining chronotypes for each user within a set of users and providing graphical user interfaces for displaying a scheduling timeline for each user of the set of users. In some embodiments, the disclosed system identifies time zones for a set of users in various geographic locations and determines chronotypes for each user within the set of users. Furthermore, the disclosed system provides a graphical user interface for display that includes a scheduling interface having a scheduling timeline for each user of the set of users that indicates a corresponding time zone and a visual representation of the chronotypes. Moreover, the disclosed system, based on receiving a user interaction via a graphical user interface including the scheduling interface, generates an event based on the time zones and the chronotypes.

20 Claims, 23 Drawing Sheets

DETERMINING CHRONOTYPES OF USERS FOR DISPLAY WITHIN A SCHEDULING INTERFACE

BACKGROUND

Advancements in computing devices and software technology have given rise to a variety of innovations in scheduling technologies. For example, existing scheduling systems can provide convenient tools for staying organized. Existing scheduling systems can also provide a variety of tools for creating calendar events for scheduling with co-workers and colleagues. Despite these advances, however, existing scheduling systems continue to suffer from a number of disadvantages, particularly in terms of efficiency, accuracy, and flexibility.

As just suggested, some existing scheduling systems are inefficient. For example, many existing scheduling systems require a user to send a calendar invitation to another user with limited information about the other user's schedule or preferences. Accordingly, due to the user guessing another user's schedule when creating and sending a calendar invitation, the calendar invitation usually needs to be updated one or more times to eventually iterate to a time and date that work with both users' schedules. In other instances, the user has limited scheduling information about another user's schedule when creating a calendar invitation because existing scheduling systems can sometimes indicate a limited binary scheduling status of "busy" or "available." However, these systems can still result in a user sending calendar invitations to another user during an inconvenient time or during a time outside of their working schedule—in part due to calendars not accurately indicating the other user's actual schedule, work preferences, and other common events that occur daily. Accordingly, even in more advanced systems that provide some limited information, it is still often the case that two users iterate back and forth by sending various rounds of calendar invitations to eventually find a time suitable for the two users. Moreover, these problems are exacerbated when a calendar invitation includes more users.

Furthermore, in addition to the above inefficiencies, existing scheduling systems also suffer from excessive navigating within inefficient graphical user interfaces. For example, in existing scheduling systems, users often provide numerous user interactions to navigate multiple screens to determine potentially appropriate meeting times for multiple other users to be included in a calendar invitation. In particular, to locate the full list of invitees, the topics, and tasks to be accomplished during an event, and appropriate times for all the invitees—existing scheduling systems generally require multiple selections and navigations through multiple graphical user interfaces. Accordingly, the navigation in existing scheduling systems to create a calendar event requires an onerous number of navigation steps from a user.

Existing scheduling systems also suffer from accuracy concerns. For example, as mentioned above, existing scheduling systems generally result in calendar invitations during times of inconvenience or during a time outside of a working schedule. Moreover, existing scheduling systems that suggest certain times for a calendar event fail to do so at an optimal time of day, e.g., the suggested calendar event time is an inaccurate suggestion that fails to suit the task at hand or the schedule of the participants. This is especially the case in situations where the users reside in different time zones. As more and more meetings are conducted across multiple time zones, existing systems fail to account for complexities inherent to scheduling a meeting including users from different times zones. As such, existing scheduling systems suffer from inaccurately creating calendar events at days and/or times that are not only undesirable for the users, but often are unworkable.

The cause of many of the above-discussed inefficiencies and inaccuracies are caused in part because many existing scheduling systems are inflexible. To elaborate, existing scheduling systems rely on a one-size-fits-all approach that relies on a user entering scheduling data for every minute of every day (e.g., the binary busy/available paradigm). This inflexibility in existing systems results in a failure to consider an individual's work preferences and/or personal schedule, which often results in generating calendar invitations that are at best impractical, but more often unworkable.

Thus, there are several disadvantages with regard to existing scheduling systems.

SUMMARY

This disclosure describes one or more embodiments of systems, methods, and non-transitory computer-readable storage media that provide benefits and/or solve one or more of the foregoing and other problems in the art. For instance, the disclosed systems and methods determine chronotypes for each user and generate a calendar event based on a combination of working habit data and chronotype data associated with client devices or user accounts corresponding to users. For instance, the working habit data in one or more embodiments, includes time zone data. In some embodiments, the disclosed systems identify time zones for a set of users associated with client devices and determines chronotypes for each user within the set of users. In addition, the disclosed systems provide, for display within a scheduling interface, the scheduling timeline for each user of the set of users. For example, the scheduling interface can visualize both time zone and chronotypes data. Moreover, based on receiving a user interaction within the scheduling interface, the disclosed systems generate a calendar event for a subset of users based on the time zones and the chronotypes data.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
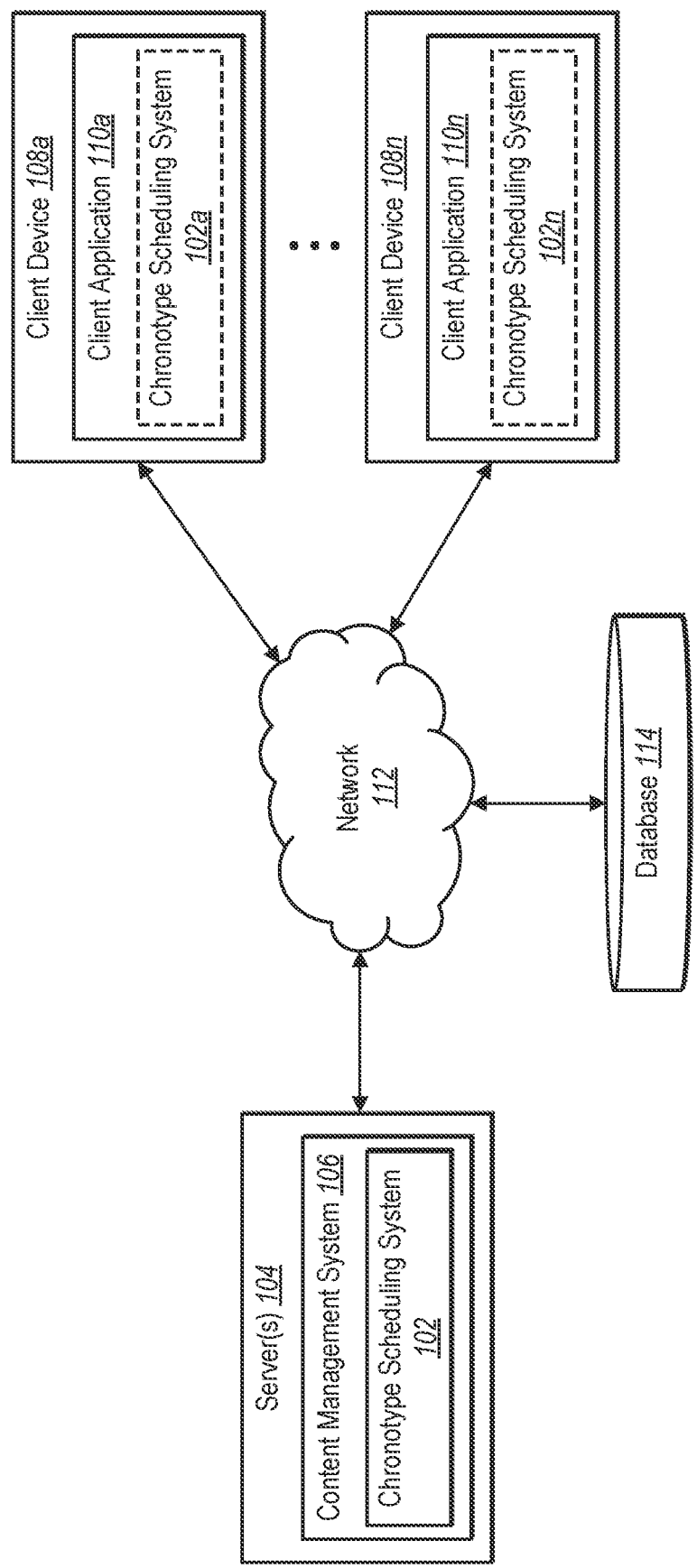
FIG. 1 illustrates a schematic diagram of an example environment of a chronotype scheduling system in accordance with one or more embodiments.

This disclosure describes one or more embodiments of identifying time zones and determining chronotypes to provide a scheduling timeline indicating corresponding time zones and visually representing chronotypes. Indeed, in a virtual-first world, scheduling events between users of a team presents a number of difficulties. However, the chronotype scheduling system provides for an easily accessible scheduling interface that shows overlapping scheduling timelines based on time zones and chronotypes. For instance, the chronotype scheduling system identifies chronotypes for various users and provides intelligent scheduling of various tasks that match an individual user's productivity mode during a particular time of day. In particular, the chronotype scheduling system identifies time zone data for a set of users in different geographic locations and determines chronotype data for each user within the set of users. Furthermore, the chronotype scheduling system generates a scheduling interface with a scheduling timeline for each user of the set of users. The scheduling timeline efficiently visualizes time zones data and chronotype data associated with each user. Moreover, the chronotype scheduling system typically extracts working habit data from one or more client devices to identify the corresponding time zones.

As mentioned above, the chronotype scheduling system determines chronotypes for individual user accounts associated with each user. In particular, the chronotype scheduling system can identify at least one of individual user responses to questionnaires, a collaboration history, individual user work times corresponding with work categories, or historical productivity measures. By utilizing these features via the chronotype machine learning model, the chronotype scheduling system can determine particular times of a day that match a particular task type for each user.

As mentioned above, the chronotype scheduling system determines chronotypes for a user account. Based on the determined chronotype associated with a given user, the chronotype scheduling system can generate a visual representation that indicates time periods within which particular task types align based on the chronotype. For example, a given user's chronotype may indicate that to optimize the user's performance, the morning hours are best for deep thinking work, while the afternoon hours are best for administrative tasks, and evening hours are best for creativity. Accordingly, the chronotypes include a pattern that indicate preference periods to perform certain task types within the scheduling interface.

Further, the chronotype scheduling system provides an option for displaying additional scheduling timelines. For example, the chronotype scheduling system can provide a scheduling interface that allows a user to add a given user's scheduling timeline to the scheduling interface. To illustrate, in response to receiving a selection to display an additional scheduling timeline, the chronotype scheduling system provides for display within the scheduling interface the additional scheduling timeline. In this way, a user can quickly add a customized set of users with which the user is likely to invite to calendar events.

Moreover, in addition to the chronotype scheduling system providing an option to add a given user's scheduling timeline to the scheduling interface, the chronotype scheduling system also intelligently provides recommendations. For example, the chronotype scheduling system utilizes machine learning principles to identify potential users to suggest to another user to add to their scheduling interface. In particular, the chronotype scheduling system determines interactions between various communication systems and systems that correspond with a content management system (CMS) or the chronotype scheduling system. For instance, based on the determination of interactions between various systems and a CMS or the chronotype scheduling system, the chronotype scheduling system intelligently identifies potentially relevant users to recommend as adding to a user's scheduling interface.

In addition, the chronotype scheduling system can display scheduling timelines based on an organization structure. For example, within a set of users, the users can be divided to various subsets based on an organization structure. In particular, based on the organization structure, the chronotype scheduling system can receive a selection of an option to display the scheduling timelines categorized by organization structure. Specifically, the chronotype scheduling system can display expandable elements that group users within the organization structure. To illustrate, upon selection of an expandable element, the chronotype scheduling system can provide for display of a scheduling timeline for the selected grouping of users.

Moreover, the chronotype scheduling system can provide various options for displaying alternative views for the scheduling timelines. For example, the chronotype scheduling system can transition the scheduling timelines to a networking graph view. In particular, the networking graph view includes a visual display of how a first user within the subset of users is connected to a second user within the subset of users. For example, a networking graph display can provide a display of users that provides contextual information about each user in a simple user interface. The chronotype scheduling system can easily allow a user to switch back and forth between the scheduling interface and the networking graph view. Similarly, the chronotype scheduling system can transition the scheduling timelines to a geographic map view. In particular, the geographic map view includes a visual geographic location display of a first user within the subset of users connected to a second user within the subset of users.

Furthermore, the chronotype scheduling system can provide various intelligent determinations. For example, the chronotype scheduling system can intelligently generate calendar events. For example, the chronotype scheduling system can utilize an auto-scheduling machine learning model. In particular, based on machine learning principles, the chronotype scheduling system auto-generates calendar events. Moreover, the chronotype scheduling system can also resolve calendar event conflicts. In one or more embodiments, the chronotype scheduling system provides intelligent determinations such as smart scheduling based on a designated expert, topic, and time. For instance, the chronotype scheduling system provides in the scheduling interface an option for a client device to designate a particular person/expert, a topic relevant to that person/expert and a particular time of day. Based on the designation by the client device, the chronotype scheduling system utilizes intelligent machine learning principles to identify an available person subject to the client device designations. The various smart features mentioned here incorporate various feature inputs such as determined chronotypes and time zones, as will be explained further below.

As suggested above, the chronotype scheduling system can provide several improvements or advantages over existing scheduling systems. For example, some embodiments of the chronotype scheduling system can improve efficiency over prior systems. For instance, as mentioned above, existing scheduling systems generally rely on calendar invitations that fail to consider the full context of a user's working preferences or hours. Unlike existing scheduling systems, the chronotype scheduling system identifies time zones, determines chronotypes, and provides for display, within a scheduling interface, a scheduling timeline that indicates corresponding time zones and visually represents chronotypes. As such, by displaying relevant scheduling timelines with time zones and chronotypes of each user within a single scheduling interface, the chronotype scheduling system provides an efficient scheduling interface that quickly allows a user to create a calendar event that will work for all users that are associated with the event.

As another example, the content visualization system also further improves efficiency by reducing the number of steps to make selections and maneuvers to determine potentially appropriate meeting times and invite lists. For example, by identifying working habit data, e.g., time zone data, for a set of users and determining chronotypes for each user within the set of users, the chronotype scheduling system generates calendar invitations based on the time zones and chronotypes. Specifically, the chronotype scheduling system minimizes the number of selections and navigations between multiple graphical user interfaces. Accordingly, the chronotype scheduling system reduces the number of navigation steps by providing for display the scheduling interface with relevant information (e.g., time zones and chronotypes) within a single scheduling interface and overcomes additional efficiency concerns.

In addition to improving upon efficiency, the content visualization system also improves upon accuracy. For example, the chronotype scheduling system generates calendar events for a subset of users from the set of users based on time zones and chronotypes. As such, the chronotype scheduling system avoids the aforementioned issues of creating calendar invitations during inconvenient times of the day or during a time outside of a working schedule. By basing calendar events on time zones and chronotypes, the chronotype scheduling system optimizes scheduling and increases the accuracy of scheduling other users, not only from the perspective of an available time, but also from the perspective of scheduling a task type within a time period that is compatible with user's chronotypes. Accordingly, the chronotype scheduling system improves upon accuracy concerns within existing scheduling systems.

Moreover, in addition to efficiency and accuracy, the chronotype scheduling system also improves upon flexibility. For example, rather than providing a one-size-fits-all approach for organizing a schedule and creating calendar events, the chronotype scheduling system accurately considers a user's work preferences by considering time zones and chronotypes. In particular, due to the chronotype scheduling system employing more individualized and tailored features, the chronotype scheduling system can practically schedule other users and create more flexibility in finding availability of users.

As illustrated by the foregoing discussion, the present disclosure utilizes a variety of terms to describe features and benefits of the chronotype scheduling system. Additional detail is hereafter provided regarding the meaning of these terms as used in this disclosure. As mentioned above, the chronotype scheduling system can identify time zones. As used herein, the term "time zone" refers to a geographically bounded region for which a uniform standard time is observed. For example, the chronotype scheduling system identifies time zones for various users in different geographic locations. In particular, the time zone in San Francisco differs from the time zone in London.

As mentioned above, the chronotype scheduling system determines chronotypes for each user within a set of users. As used herein, the term "chronotype" refers to a behavioral manifestation of an underlying circadian rhythm. For example, chronotypes can include an individual's sleeping propensities and working habits. In particular, the chronotype may refer to eveningness as most active and alert in the evening whereas morningness refers to most active and alert in the morning. Further, chronotypes can range between eveningness and morningness. To illustrate, the chronotype scheduling system can determine the chronotypes for each user to determine working habits such as the early morning hours as most suited for analytical tasks, the late morning hours as most suited for administrative tasks, and the afternoon hours as most suited for creative tasks. For instance, a chronotype indicates that for a user with the morningness chronotype, that user is best suited for analytical tasks in the morning hours and creative tasks in the afternoon hours.

As mentioned above, the chronotype scheduling system provides for display of the scheduling interface. As used herein, the term "scheduling interface" refers to a graphical user interface for displaying events, collaboration between various users, a chart of days, weeks, and months, and various other scheduling features. For example, the scheduling interface can include a timeline for the day with individual working schedules such as a personal work schedule, co-user work schedules, and availability within the work schedule. In particular, the scheduling interface can include additional options for further customizing a schedule, adding additional events, finding additional users, determining topics for collaboration with other co-users, and various displays for viewing the scheduling interface.

As mentioned above, the chronotype scheduling system provides for display, within a scheduling interface, a scheduling timeline. As used herein, the term "scheduling timeline" refers to a chronological visualization of one or more user schedules. For example, the term scheduling timeline includes a chronological visualization of one or more user schedules within the above-mentioned scheduling interface. In particular, the scheduling timeline indicates relevant information pertaining to a user schedule. To illustrate, the scheduling timeline indicates a corresponding time zone and a visual representation of chronotypes.

As mentioned above, the chronotype scheduling system identifies time zones for a set of users. As used herein, the term "set of users" refers to a plurality of users grouped together by at least one of organization or task. For example, a set of users can include users that are part of the same organization and/or users outside of the organization.

As mentioned above, the chronotype scheduling system generates calendar events. As used herein, the term "calendar event" refers to a scheduled occurrence that involves one or more participants (e.g., users). For example, a calendar event includes data such as a task(s), required participants, optional participants, day and month, time of day, and duration of the occurrence. In particular, the chronotype scheduling system can receive a user interaction with the scheduling interface to create a calendar event. To illustrate, the chronotype scheduling system generates the calendar event based on the user interaction with the scheduling interface. Furthermore, the calendar event includes a subset of users of the set of users, and the chronotype scheduling system additionally bases the calendar event on time zones and chronotypes.

As mentioned above, the chronotype scheduling system provides an option for displaying the scheduling timelines based on an organization structure. As used herein, the term "organization structure" refers to grouping hierarchies within an organization. For example, an organization structure includes an organization such as a business and various branches of the business. In particular, various branches of an organization can include marketing, sales, engineering, and compliance. Furthermore, each of the branches of the organization can indicate hierarchies such as high-level management positions, low-level management positions and employees under each of the management positions. To illustrate, the chronotype scheduling system provides an option for displaying, within the scheduling interface, scheduling timelines based on an organization structure.

As mentioned above, the chronotype scheduling system can provide an option to transition the scheduling interface view to a networking graph view. As used herein, the term "networking graph view" refers to a visual representation of connections between various users of the set of users. For example, the networking graph view can show a first user connected to a second user. In particular, the connection between the first and second user includes a prior, present, or future meeting collaboration between the two users. For instance, the networking graph view provides a visual display of past, present, and future meeting connections between different users of the set of users. Moreover, in other instances the networking graph view provides a visual display of connections between different users of the set of users based on interactions between various systems. For instance, the various systems include communication systems or other types of collaborative interactions between users. Accordingly, the networking graph view provides visual connections of users based on their interactions on various systems.

As also mentioned above, the chronotype scheduling system can provide an option for displaying the scheduling interface as a geographic map view. As used herein, the term "geographic map view" refers to a visual geographic map of connections between various users. For example, the geographic map view includes showing a first user's geographic location and their connection to a second user in the second user's geographic location. In particular, the connection between the first and second user includes a past or future meeting collaboration. For instance, the visual representation of a geographic map indicating user locations and connections provides an alternative option for users viewing a scheduling interface.

As mentioned above, the chronotype scheduling system can provide a quick link corresponding with each scheduling timeline. As used herein, the term "quick link" refers to a link that provides a fast pathway to opening an application. For example, a quick link includes a link that, when selected, routes the user to an application such as a communication application. In particular, a user selects a quick link and the chronotype scheduling system opens an application for a user to quickly message another user via a communication application. Further, a communication application includes various messaging applications such as instant messaging, email, SMS, and other communication platforms (e.g., social media). Additionally, in one or more embodiments, quick links include deep links.

As used herein, the term "machine learning model" refers to a computer algorithm or a collection of computer algorithms that automatically improve for a particular task through iterative outputs or predictions based on use of data. For example, a machine learning model can utilize one or more learning techniques to improve accuracy and/or effectiveness. Example machine learning models include various types of neural networks, decision trees, support vector machines, linear regression models, and Bayesian networks. As described in further detail below, the chronotype scheduling system utilizes a "chronotype machine learning model" that can include, for example, one or more neural networks, to determine or predict the chronotype of each user. In addition, the chronotype scheduling system utilizes a "machine learning model" such as a neural network to determine or predict the likelihood of an individual user having a certain chronotype.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a content attribute neural network or a dynamic facet neural network.

Additional detail regarding the chronotype scheduling system will now be provided with reference to the figures. For example, FIG. 1 illustrates a schematic diagram of an example system environment for implementing a chronotype scheduling system 102 in accordance with one or more implementations. An overview of the chronotype scheduling system 102 is described in relation to FIG. 1. Thereafter, a more detailed description of the components and processes of the chronotype scheduling system 102 is provided in relation to the subsequent figures.

As shown, the environment includes server(s) 104, a content management system 106, a chronotype scheduling system 102, a client device 108a, client application 110a, a client device 108n, client application 110n a database 114, and a network 112. Each of the components of the environment can communicate via the network 112, and the network 112 may be any suitable network over which computing devices can communicate. Example networks are discussed in more detail below in relation to FIGS. 13-14.

As mentioned above, the example environment includes a client device 108a-108n. The client device 108a-108n can be one of a variety of computing devices, including a smartphone, a tablet, a smart television, a desktop computer, a laptop computer, a virtual reality device, an augmented reality device, or another computing device as described in relation to FIGS. 13-14. The client devices 108a-108n can communicate with the server(s) 104 and/or the database 114 via the network 112. For example, the client devices 108a-108n can receive user input from a user interacting with the client devices 108a-108n (e.g., via the client application 110a-110n) to, for instance, access, generate, or view a scheduling interface with various scheduling timelines indicating chronotypes. In addition, the chronotype scheduling system 102 on the server(s) 104 can receive information relating to various interactions with the scheduling interface based on the input received by the client devices 108a-108n.

As shown, the client devices 108a-108n can include client applications 110a-110n. In particular, the client applications 110a-110n may be a web application, a native application installed on the client devices 108a-108n (e.g., a mobile application, a desktop application, etc.), or a cloud-based application where all or part of the functionality is performed by the server(s) 104. Based on instructions from the client applications 110a-110n, the client devices 108a-108n can present or display the scheduling interface with scheduling timelines and corresponding time zones and chronotypes.

As illustrated in FIG. 1, the example environment also includes the server(s) 104. The server(s) 104 may generate, track, store, process, receive, and transmit electronic data, such as schedules, topic tasks, chronotypes, answers to questionnaires, user features, and/or interactions between user accounts or client devices. For example, the server(s) 104 may receive data from the client devices 108a-108n in the form of schedule data. In addition, the server(s) 104 can transmit data to the client devices 108a-108n in the form updating the graphical user interface based on the received scheduling data, chronotypes, or some other information. Indeed, the server(s) 104 can communicate with the client devices 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the chronotype scheduling system 102 as part of the content management system 106. The content management system 106 can communicate with the client devices 108a-108n to perform various functions associated with the client applications 110a-110n such as managing user accounts, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the chronotype scheduling system 102 and/or the content management system 106 utilize the database 114 to store and access information such as digital content items, content attributes, content collections, and other information.

Although FIG. 1 depicts the chronotype scheduling system 102 located on the server(s) 104, in some implementations, the chronotype scheduling system 102 may be implemented by (e.g., located entirely or in part) on one or more other components of the environment. For example, the chronotype scheduling system 102 may be implemented by the client devices 108a-108n, and/or a third-party device. For example, the client devices 108a-108n can download all or part of the chronotype scheduling system 102 for implementation independent of, or together with, the server(s) 104. Further, as shown, FIG. 1 illustrates the client device 108a implementing chronotype scheduling system 102a and client device 108n implementing chronotype scheduling system 102n.

In some implementations, though not illustrated in FIG. 1, the environment may have a different arrangement of components and/or may have a different number or set of components altogether. For example, the client devices 108a-108n may communicate directly with the chronotype scheduling system 102, bypassing the network 112. As another example, the environment may include multiple client devices, each associated with a different user account for managing digital content items, scheduling, and/or chronotypes. In addition, the environment can include the database 114 located external to the server(s) 104 (e.g., in communication via the network 112) or located on the server(s) 104 and/or on the client device 108a-108n.

Figure 2:
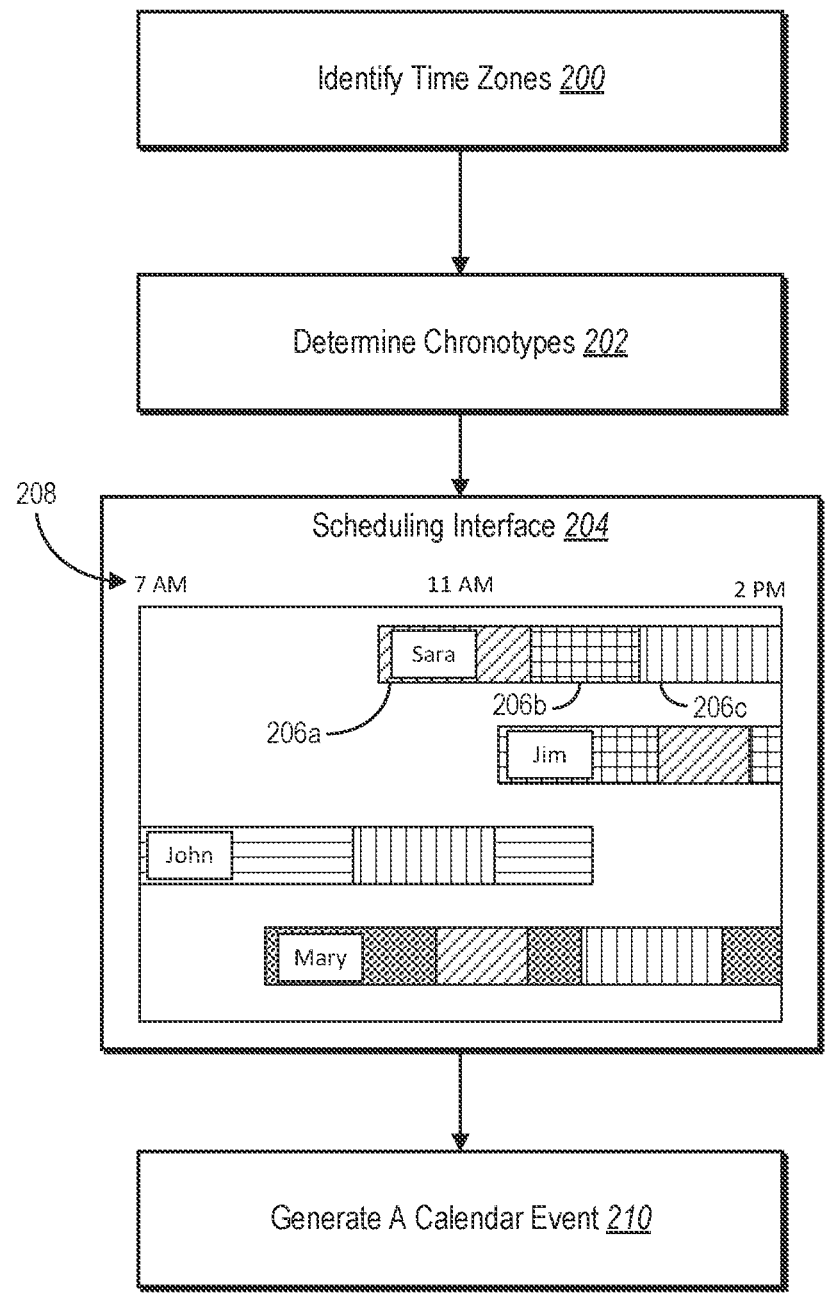
FIG. 2 illustrates an example diagram of providing a scheduling interface with a visual display of chronotypes and generating a calendar event in accordance with one or more embodiments.

As discussed above, the chronotype scheduling system 102 generates a calendar event based on identifying time zones and determining chronotypes. As illustrated, FIG. 2 shows an overview figure of the chronotype scheduling system 102 providing a scheduling interface with a scheduling timeline for each user of a set of users and generating a calendar event for a subset of users from the set of users. Here, in FIG. 2, for the scheduling timelines and generated calendar invitation, the chronotype scheduling system 102 defines the subset of users from the set of users based on at least one of a common email address domain, participants joining a group via a link, or participants granting permission to share scheduling information with the chronotype scheduling system 102.

As mentioned above, the chronotype scheduling system 102 identifies time zones 200 for the set of users. Time zones 200 were discussed above. For example, the chronotype scheduling system 102 parses through a list of each user of the set of users to identify corresponding time zones 200. In particular, the chronotype scheduling system 102 identifies time zones 200 based on at least one of i) location data, ii) client device settings, or iii) responses to questionnaires. For instance, in one or more embodiments, the chronotype scheduling system 102 identifies time zones 200 based on location data such as an internet protocol (IP) address. In other instances, the chronotype scheduling system 102 identifies time zones 200 based on client device settings such as an automatically set time zone on the scheduling interface. In particular, the automatically set time zone includes detecting the time zone based on the client device activating location settings. In other instances, the chronotype scheduling system 102 identifies time zones 200 based on responses to questionnaires. For example, the chronotype scheduling system 102 sends a notification to a client device to respond to a questionnaire indicating the client device's time zone.

As also mentioned above, the chronotype scheduling system 102 determines chronotypes 202. For example, the chronotype scheduling system 102 determines chronotypes 202 for each user within the set of users. In particular, the chronotype scheduling system 102 determines chronotypes 202 by at least one of i) presenting a series of questions via a questionnaire, ii) by polling other users of the sets of users with questions, or iii) utilizing machine learning principles. For instance, the chronotype scheduling system 102 can utilize a combination of the above methods to determine chronotypes 202. In particular, the chronotype scheduling system 102 can initially send a questionnaire to an individual user and a questionnaire to other users of the set of users. Moreover, in response to receiving responses to the questionnaires, the chronotype scheduling system 102 can utilize a machine learning model to further hone in on an accurate chronotype for an individual user.

As mentioned, in one or more embodiments, the chronotype scheduling system 102 determines chronotypes 202 by presenting a series of questions via a questionnaire. In particular, the chronotype scheduling system 102 presents a series of questions relating to an individual user's preferences, work categories, work habits, collaboration history, and historical productivity measures. For instance, the chronotype scheduling system 102 can present a questionnaire to an individual user that includes the following example questions: a) What time do you wake up? b) What time do you prefer to perform analytical/creative/administrative tasks? c) Do you consider yourself a morning person? d) In the last month how many projects did you complete? e) For technical matters, at what time of the day do you prefer to schedule meetings? or f) For brainstorming meetings, at what time of the day do you prefer to schedule meetings? Moreover, based on an individual user response to the series of questions presented as a questionnaire, the chronotype scheduling system 102 can determine chronotypes 202 for users based on predetermined mappings between answers to questions and certain chronotypes.

As mentioned, in one or more embodiments, the chronotype scheduling system 102 polls other users of the sets of users with questions to determine chronotypes 202. For example, similar to the above paragraph, the chronotype scheduling system 102 sends questionnaires to other users and does not send a questionnaire to the individual user. In this manner, the chronotype scheduling system 102 can determine chronotypes 202 for a user based on responses to questionnaires by other users of the set of users. In particular, the chronotype scheduling system 102 can utilize similar questions listed above but regarding a different user. For example, the chronotype scheduling system 102 in polling other users to determine the chronotype for the individual user can ask the following example questions: a) Do you consider [X user] to be a morning person? b) When do you notice [X user] to be most productive? or c) For working with [X user] on technical tasks, what time of the day does [X user] seem the most engaged? As also mentioned, in one or more embodiments, the chronotype scheduling system 102 utilizes machine learning principles to determine chronotypes 202. More details relating to the chronotype scheduling system 102 utilizing machine learning to determine chronotypes 202 is discussed in the description of FIGS. 3 and 11.

As also shown, FIG. 2 illustrates the chronotype scheduling system 102 providing for displaying a scheduling interface 204. For example, FIG. 2 shows the scheduling interface 204 with times 208 (e.g., 7 a.m., 11 a.m., and 2 p.m.) and individual scheduling timelines. In particular, FIG. 2 shows scheduling timelines for 'Sara', 'Jim', 'John', and 'Mary.' For instance, FIG. 2 shows Sara's scheduling timeline with various chronotype patterns. In particular, FIG. 2 shows a first chronotype pattern 206a, a second chronotype pattern 206b, and a third chronotype pattern 206c. To illustrate, the first chronotype pattern 206a can represent a chronotype for greatest productivity for analytical tasks. The second chronotype pattern 206b can represent a chronotype for greatest productivity for creative tasks, and the third chronotype pattern 206c can represent a chronotype for greatest productivity for administrative tasks. More details regarding the scheduling interface 204 is given below in the description of FIGS. 4A-10C. As further shown, FIG. 2 illustrates the chronotype scheduling system 102 generating a calendar event 210. More details regarding generating the calendar event 210 is given below in the description of FIGS. 4A-4B.

Figure 3:
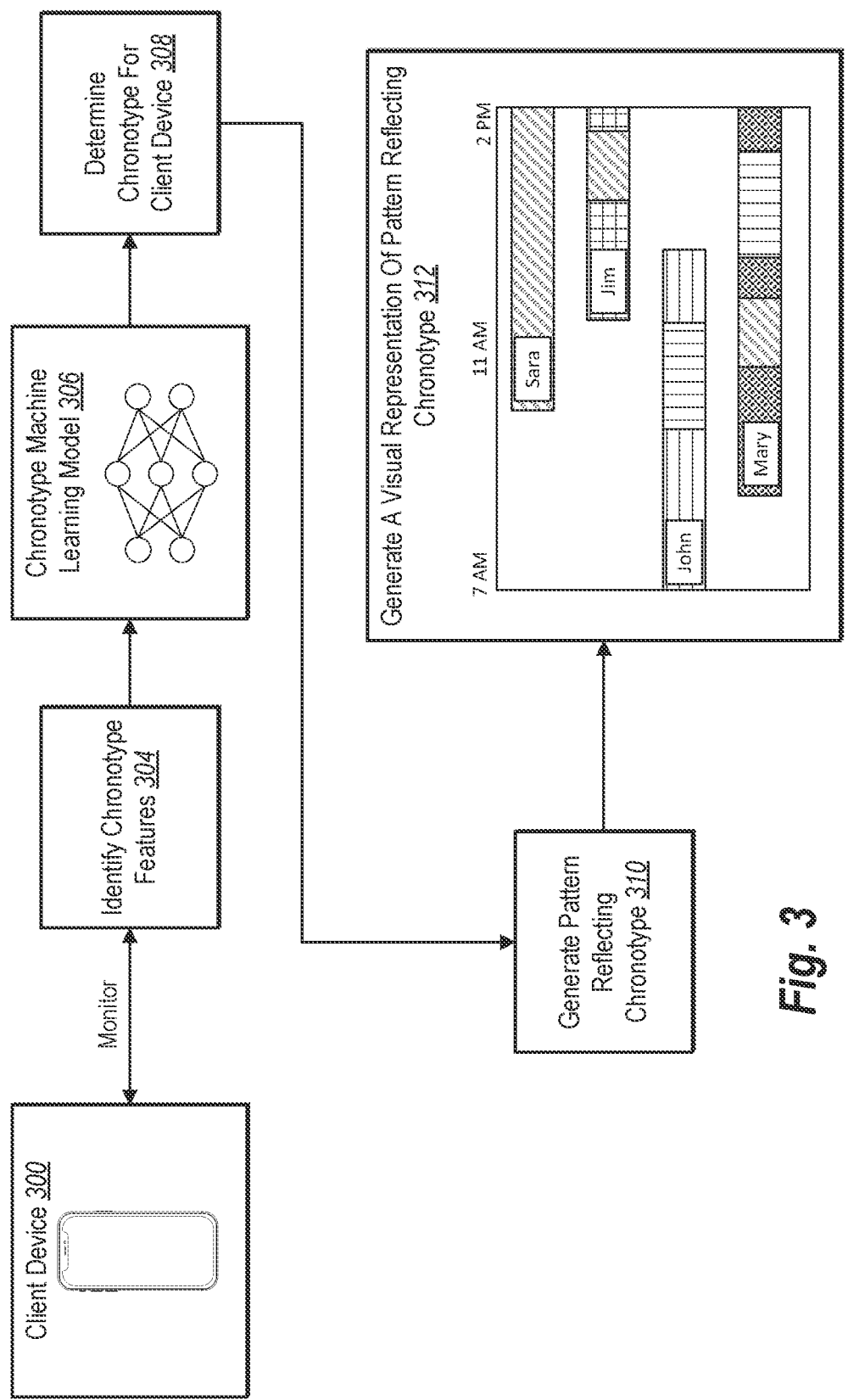
FIG. 3 illustrates an example diagram for determining chronotypes in accordance with one or more embodiments.

As mentioned above, FIG. 3 illustrates more details of the chronotype scheduling system 102 utilizing a machine learning model to determine chronotypes. For example, FIG. 3 illustrates a client device 300 and the chronotype scheduling system 102 monitoring the client device 300. In particular, the chronotype scheduling system 102 monitors the client device 300 by at least one of: i) sending requests to the client device 300 to obtain relevant chronotype features 304 for determining chronotypes; or ii) automatically receiving all the relevant chronotype features 304. For instance, in one or more embodiments where the chronotype scheduling system 102 sends a request to the client device 300, the client device 300 sends data packets containing various chronotype features 304 to the chronotype scheduling system 102.

In other embodiments, the chronotype scheduling system 102 monitors the client device 300 by automatically receiving all relevant chronotype features 304 for utilization within the chronotype machine learning model 306. In particular, the chronotype scheduling system 102 can automatically receive all relevant chronotype features 304 by obtaining access to the client device's 300 scheduling interface. Accordingly, by obtaining access the client device 300 scheduling interface, the chronotype scheduling system 102 receives all relevant features such as scheduled events or working hours. Furthermore, in one or more embodiments, the chronotype scheduling system 102 obtains access to a content management system (CMS). In particular, the chronotype scheduling system 102 obtains access to the CMS corresponding with the client device 300. For instance, the CMS corresponding with the client device 300 contains uploaded files, saved projects, completed projects, and various types of other files. Moreover, the chronotype scheduling system 102 obtaining access to the CMS corresponding with the client device 300 allows for the chronotype scheduling system 102 to determine relevant chronotype features 304. In particular, the chronotype scheduling system 102 can utilize a machine learning model to parse through various files of a CMS and identify relevant chronotype features 304.

As mentioned previously, the chronotype scheduling system 102 determines chronotypes by identifying individual user responses to questionnaires, a collaboration history, individual user work times corresponding with work categories, or historical productivity measures. In one or more embodiments, user responses to questionnaires refers to a series of questions identifying work habits and sleeping patterns, as previously discussed above. In one or more embodiments, collaboration history refers to meetings between one or more users. In particular, the chronotype scheduling system 102 utilizes the collaboration history as a chronotype feature to determine specific times of day that a user collaborates with others and the type of collaboration (e.g., the type of project: creative, analytical, administrative, etc.).

In one or more embodiments, individual user work times corresponding with work categories refers to a time of the day a user performs certain tasks. In particular, a user may exhibit a pattern of consistently performing analytical tasks during the morning hours. In one or more embodiments, historical productivity measures refer to past performance for completing certain tasks. In particular, the historical productivity measures include a user consistently finishing a project during the afternoon hours. For instance, historical productivity measures identify trends in work productivity by identifying project progress and completion (e.g., quantity of work done, and time spent working). In particular, as was mentioned above, the chronotype scheduling system 102 obtains access to the CMS corresponding to the client device 300, in doing so, the chronotype scheduling system 102 can determine when certain files are uploaded, the progress of various projects, and the completion of various projects.

As also mentioned above, the chronotype scheduling system 102 utilizes a chronotype model that includes a machine learning model. In particular, the chronotype scheduling system 102 can utilize a chronotype machine learning model 306 to determine the chronotypes for each user by inputting the individual user responses to questionnaires, the collaboration history, the individual user work times corresponding with work categories, and/or the historical productivity measures into the chronotype machine learning model 306. For example, the chronotype machine learning model 306 can receive the aforementioned features, where a combination of the features can indicate a relevant chronotype. In particular, the chronotype scheduling system 102 can utilize the chronotype machine learning model to analyze various chronotype features 304 and can encode the information, (e.g., using one hot encoding, an encoding layer, or a vector mapping) and then process the encoding utilizing the chronotype machine learning model 306 to perform an act 308 of generating a chronotype to associate with a user account associated with the client device 300.

As mentioned above, the chronotype scheduling system 102 performs the act 308 of determining the chronotype for the client device 300 (i.e., a user account associated with the client device). For example, the chronotype scheduling system 102 based on the chronotype machine learning model 306. In particular, the chronotype scheduling system 102 determines chronotypes and can periodically update the chronotype for an individual user of the client device 300. For instance, the chronotype scheduling system 102 can: a) re-determine a chronotype for the client device 300 every couple of months; b) re-determine chronotypes daily based on newly received chronotype features 304; or c) re-determine a chronotype based on an individual user of the client device 300 indicating that the chronotype determined by the chronotype machine learning model 306 may not be accurate.

Furthermore, FIG. 3 illustrates the chronotype scheduling system 102 performing an act 310. For example, the act 310 includes the chronotype scheduling system 102 generating a pattern reflecting a chronotype. In particular, the chronotype scheduling system 102 can generate a pattern reflecting the chronotype by generating one or more of a color pattern, a visual pattern of various shapes and lines, and/or a textual pattern. In one or more embodiments, the chronotype scheduling system 102 can utilize a combination of the just mentioned pattern types to reflect the chronotype determined by the chronotype scheduling system 102. Moreover, the chronotype scheduling system 102 generates for providing within the scheduling interface a chronotype pattern key (e.g., legend) to assist a user of the client device 300 in determining the visual significance of the chronotype pattern (e.g., what types of task types align with the various time periods indicated in the scheduling blocks for each user.

Moreover, FIG. 3 illustrates the chronotype scheduling system 102 performing an act 312 that includes generating a visual representation of the pattern reflecting the chronotype. In particular, the chronotype scheduling system 102 displays the visual representation of the pattern reflecting the chronotype within a graphical user interface of the scheduling interface. As shown in FIG. 3, the chronotype scheduling system 102 provides for display various users with various chronotype patterns. For example, the chronotype pattern can indicate that for Sara, from around 11 a.m. to 2 p.m., Sara prefers to perform administrative tasks. While for Jim, from around 11:30 a.m. to 1 p.m., Jim prefers to perform managerial tasks and from 1 p.m. to 2 p.m., Jim prefers to perform administrative tasks. Whereas for Mary, from 8 a.m. to 11 a.m., Mary prefers to perform analytical tasks and John from 7 a.m. to 10 a.m. prefers to perform creative tasks. Specifically, the chronotype scheduling system 102 can display the chronotype pattern key with a small icon representing a certain pattern and a keyword next to the icon such as "creative".

Figure 4A:
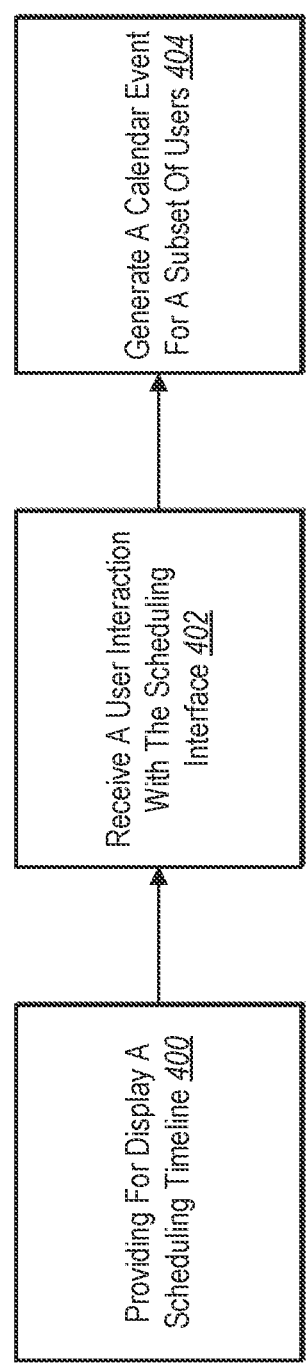
FIGS. 4A-4B illustrate an example diagram and graphical user interface for generating a calendar event for a subset of users in accordance with one or more embodiments.
Figure 4B:
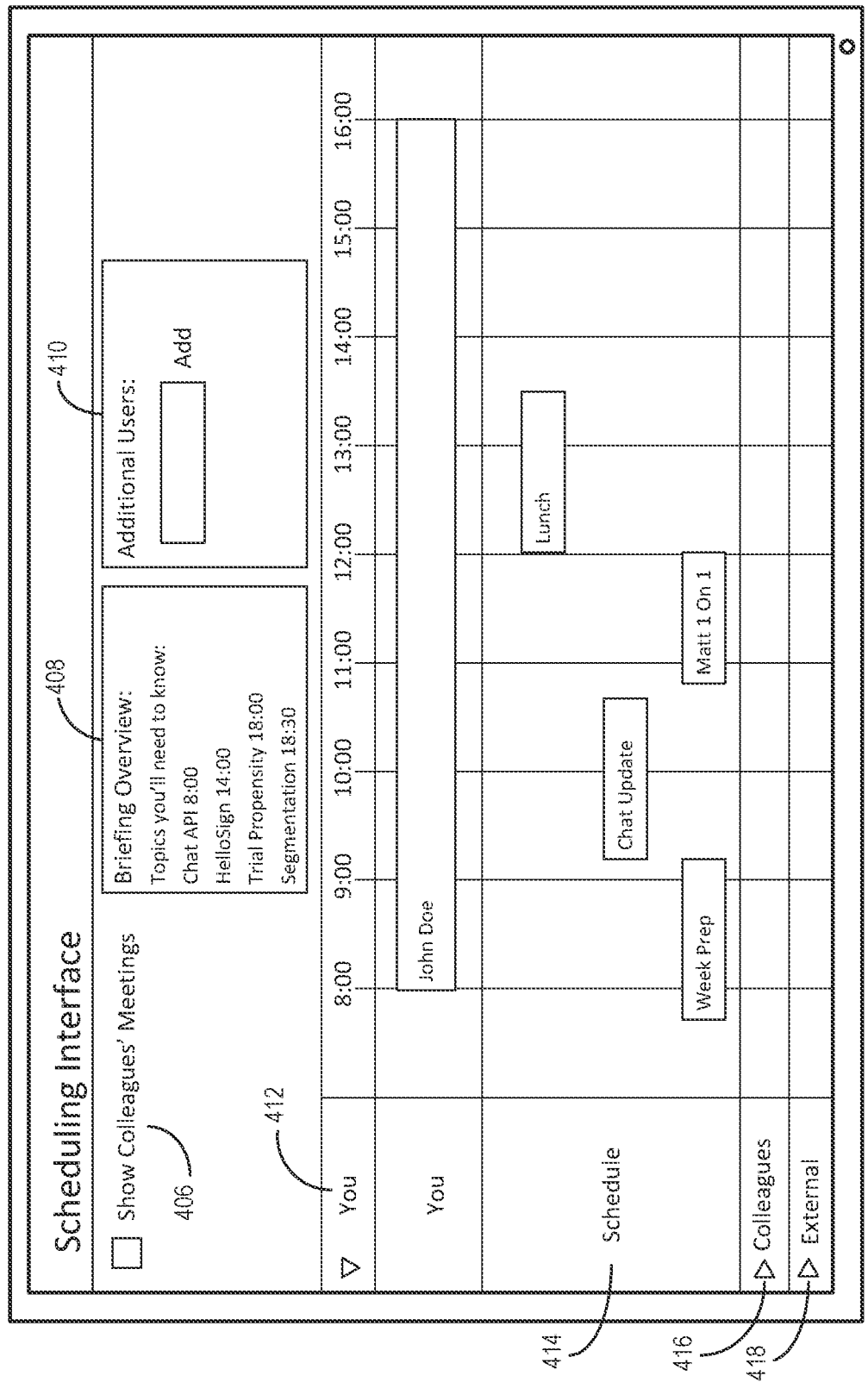

As mentioned above, FIGS. 4A-4B discusses the chronotype scheduling system 102 generating a calendar event. FIGS. 4A-4B illustrates that in one or more embodiments, the chronotype scheduling system 102 provides an initial display of an individual user's schedule within the scheduling interface. For example, FIG. 4A relates to some of the back-end aspects of generating a calendar event while FIG. 4B relates to the graphical user interface aspects of generating a calendar event. As illustrated, FIG. 4A shows the chronotype scheduling system 102 performing an act 400 that includes providing for display a scheduling timeline. In particular, the chronotype scheduling system 102 provides for display a scheduling timeline based on an individual user's scheduling data associated with a user account. For instance, the chronotype scheduling system 102 receives data packets indicating scheduling events for an individual user associated with the client device. Furthermore, the data packets indicating scheduling events also includes the above-discussed chronotype features. For example, the chronotype scheduling system 102 receives information such as time zone settings, working hours of an individual user, chronotype information, and scheduled meetings. Specifically, based on receiving various scheduling data packets, the chronotype scheduling system 102 segments the data packets into various categories such as individual user workday and scheduled events. Moreover, based on segmenting the data packets into various categories, the chronotype scheduling system 102 can then generate for display the graphical user interface discussed in FIG. 4B.

As also illustrated, FIG. 4A shows the chronotype scheduling system 102 performing an act 402 that includes the chronotype scheduling system 102 receiving a user interaction with the scheduling interface. In particular, the chronotype scheduling system 102 receives a user interaction which can include i) an individual user associated with a client device selecting/swiping/clicking an option to generate a calendar event, or ii) a user receiving a message/email from another user to meet. In one or more embodiments, the individual user selecting/swiping/clicking an option includes the chronotype scheduling system 102 presenting a visual option to generate a calendar event. Furthermore, in one or more embodiments, the chronotype scheduling system 102 receives a user interaction with the scheduling interface by an individual user associated with a client device viewing a message/email. In particular, as mentioned above, an individual user can receive a message/email from another asking the individual user to set up a meeting to discuss a certain topic. In response to the individual user viewing this message, the chronotype scheduling system 102 receives the user interaction with the scheduling interface of viewing the message.

In one or more embodiments, based on the act 402 of receiving a user interaction with the scheduling interface, the chronotype scheduling system 102 receives, from the client device, a data packet. For example, the client device sends a data packet that includes the data indicating a calendar event. In response to the chronotype scheduling system 102 receiving a data packet indicating the calendar event, the chronotype scheduling system 102 sends additional data packets to the client device to display additional options for fleshing out details of the calendar event. Moreover, the user of the client device can fill out the additional options and the client device subsequently sends the data packet with the additional details back to the chronotype scheduling system 102.

Furthermore, as shown in FIG. 4A, the chronotype scheduling system 102 performs an act 404 that includes generating a calendar event for a subset of users. In particular, the chronotype scheduling system 102 generates the calendar event based on the received data packets from the client device. Furthermore, the chronotype scheduling system 102 provides for display the generated calendar event that includes a subset of users on the graphical user interface of the client device.

As mentioned above, FIG. 4B illustrates the chronotype scheduling system 102 providing for display the scheduling interface and generating calendar events. For example, FIG. 4B shows a graphical user interface with an individual user's working hours 412. In particular, as mentioned in FIG. 4A, the chronotype scheduling system 102 receives data packets relating to working hours 412 and segments the data packets into appropriate categories. FIG. 4B shows the chronotype scheduling system 102 displaying the working hours 412 in the scheduling interface spanning from 8:00 a.m. to 4:00 p.m.

Additionally, FIG. 4B shows the chronotype scheduling system 102 displaying a schedule 414 of various calendar events during the working hours 412. For example, the chronotype scheduling system 102 bases the schedule 414 on received data packets corresponding to calendar events by the individual user. In particular, FIG. 4B shows the chronotype scheduling system 102 displaying four calendar events such as "week prep", "chat update", "Matt 1 on 1" and "lunch". The schedule 414 in FIG. 4B also indicates when the individual user is unavailable.

Furthermore, FIG. 4B shows additional tabs on the scheduling interface. For example, FIG. 4B shows colleagues tab 416 and external tab 418 with an expandable arrow element. For example, in response to receiving a selection of colleagues tab 416 or external tab 418, the chronotype scheduling system 102 can provide for display schedules in addition to the individual user. Specifically, the chronotype scheduling system 102 can cause the colleagues tab 416 and external tab 418 tab to show users that are specifically involved with the displayed schedule 414 (e.g., users participating in "Week prep" or "Chat update"). More details relating to the graphical user interface of colleagues tab 416 and external tab 418 is given below in the description of FIG. 5B.

Moreover, FIG. 4B shows an option for showing colleagues' meetings 406. For example, as mentioned previously, the option for showing colleagues' meetings 406 includes showing colleagues' working hours (e.g., the same as working hours 412 but for colleagues) and schedule (e.g., the same as schedule 414 but for colleagues). In particular, the individual user can select the colleagues tab 416 tab to expand and display the working hours of the colleagues. Furthermore, in response to the individual user selecting colleague's meetings 406, the chronotype scheduling system 102 displays scheduled meeting blocks within the colleagues' working hours to indicate availability.

FIG. 4B also illustrates a briefing overview 408. As mentioned previously, the chronotype scheduling system 102 can intelligently generate the briefing overview 408. For example, the chronotype scheduling system 102 identifies the schedule 414 of the individual user and express or implicit topic types within the schedule 414. Based on the identified schedule 414, the chronotype scheduling system 102 extracts keywords/topics for discussion to take place within the scheduled meetings. In particular, based on the schedule 414, the chronotype scheduling system 102 compiles the extracted keywords/topics within a single list at the top of the scheduling interface. Furthermore, the briefing overview 408 also includes a corresponding time in which the extracted keywords/topics are discussed.

In one or more embodiments, the chronotype scheduling system 102 utilizes a smart briefing machine learning model to display the briefing overview 408. In particular, the chronotype scheduling system 102 utilizes the smart briefing machine learning model to receive all texts, files and keywords associated with scheduled meetings as inputs. Furthermore, based on receiving all the keywords as inputs, the chronotype scheduling system 102 via the smart briefing machine learning model generates a topic output. The chronotype scheduling system 102 utilizes the generated topic output for use within the briefing overview 408.

In one or more embodiments, the chronotype scheduling system 102 provides an option for additional users 410. In particular, as mentioned above, additional users 410 includes displaying additional schedules and working hours for colleagues or others that do not initially show up on the scheduling interface. As mentioned above, the chronotype scheduling system 102 can initially show just relevant colleagues in the scheduling interface upon selection of the colleagues tab 416 tab, however, the additional users 410 option provides for displaying additional users not initially deemed relevant. To illustrate, the additional users 410 option provides for the individual user of the scheduling interface to view additional user's schedules prior to creating calendar meetings.

Figure 5A:
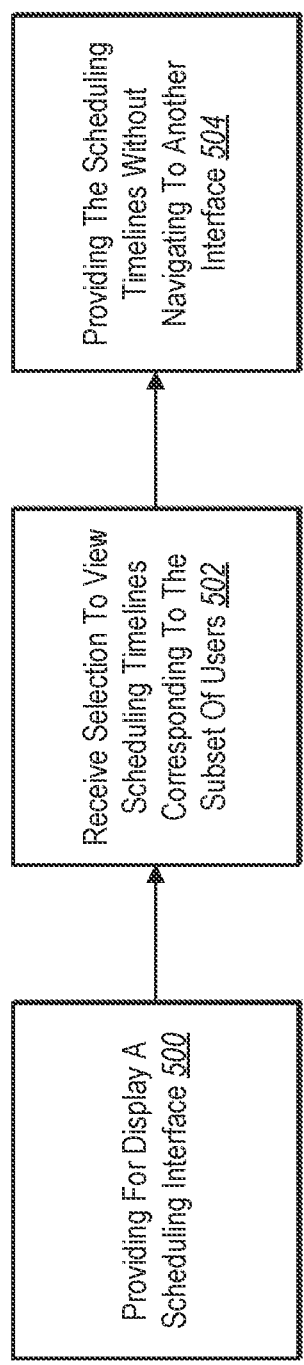
FIGS. 5A-5B illustrate an example diagram and graphical user interface for providing scheduling timelines without navigating to another interface in accordance with one or more embodiments.
Figure 5B:
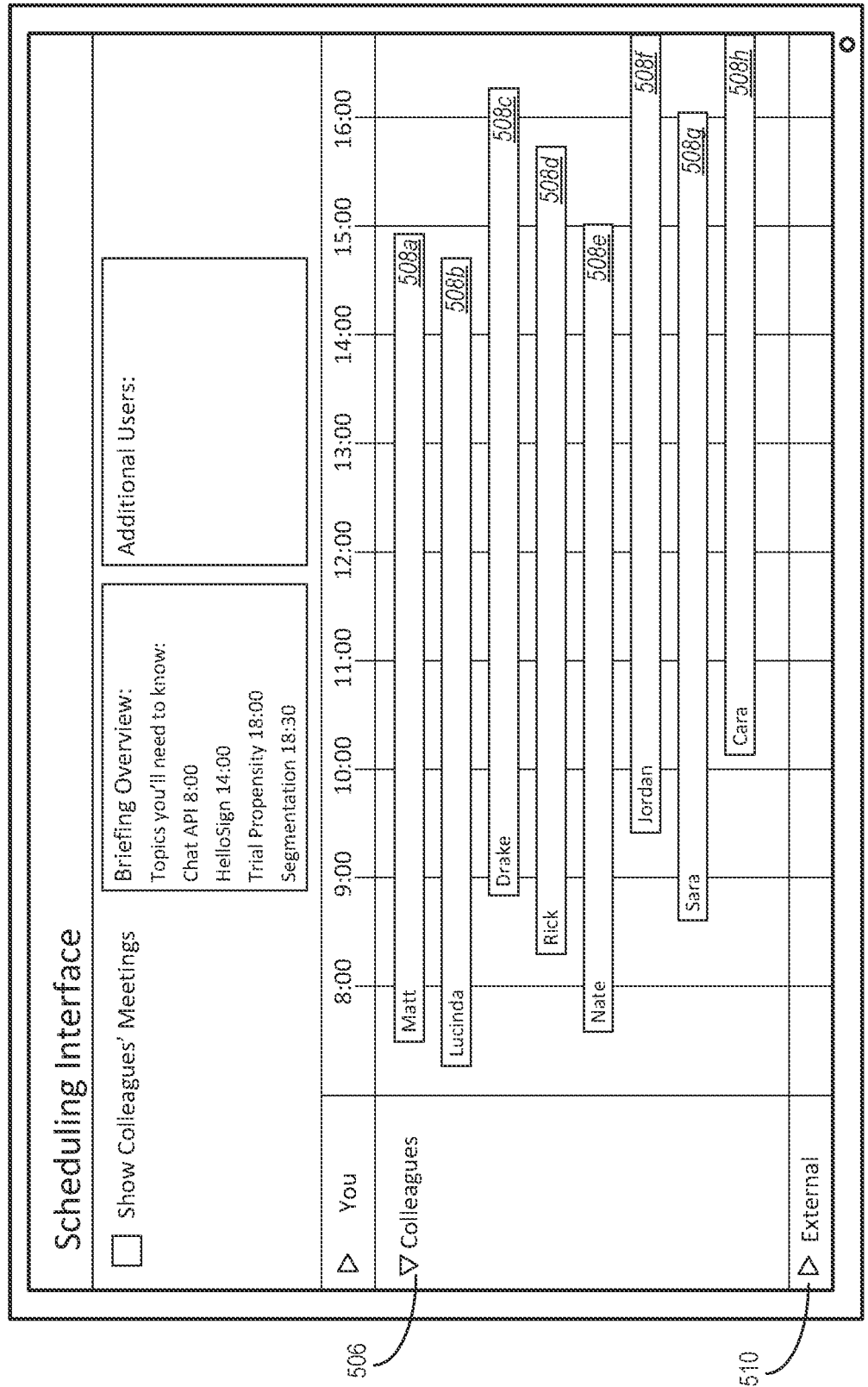

As mentioned above, the chronotype scheduling system 102 can display colleagues' working hours (e.g., working hours 412). As shown by FIGS. 5A-5B, the chronotype scheduling system 102 can provide for display the scheduling timelines of other users without navigating to another interface, thus reducing or eliminating navigation steps compared to existing systems. For example, FIG. 5A shows the chronotype scheduling system 102 performing an act 500 of providing for display the scheduling interface and further performing an act 502. In particular, the act 502 includes receiving a selection to view scheduling timelines corresponding to the subset of users. For instance, as previously discussed, the chronotype scheduling system 102 receives the selection to view scheduling timelines of the subset of users based on the individual user selecting/swiping/clicking an option. Furthermore, the selection to view scheduling timelines of the subset of users further involves the chronotype scheduling system 102 identifying the relevant subset of users based on the schedule (e.g., schedule 414) of the individual user.

In one or more embodiments, as shown in FIG. 5A, the chronotype scheduling system 102 further performs an act 504 that includes providing the scheduling timelines without navigating to another interface. Furthermore, the act of providing the scheduling timelines without navigating to another interface provides the advantage of efficiently viewing colleague schedules and generating calendar events based on the colleague schedules. As shown, FIG. 5B illustrates the chronotype scheduling system 102 providing for display on the client device the scheduling timelines corresponding to the subset of users within the scheduling interface. For example, FIG. 5B shows colleagues 506 tab expanded to display various colleague scheduling timelines 508a-508h. In particular, FIG. 5B shows a selection of the colleagues 506 tab and a subsequent expansion of the colleagues 506 tab to display relevant colleagues' working hours. Specifically, scheduling timelines 508a-508h display the working hours of colleagues identified by the chronotype scheduling system 102 as relevant to the scheduling interface of the individual user. Moreover, FIG. 5B shows an option to select "show colleagues' meetings." In particular, selecting the option "show colleagues' meetings" causes the chronotype scheduling system 102 to display in addition to the scheduling timelines 508a-508h scheduled meetings for each of the scheduling timelines 508a-508h. For example, the scheduled meetings can include availability blocks for the scheduling timelines 508a-508h. Accordingly, selecting the option to show colleagues' meetings shows both practical hours for scheduling a colleagues and the availability of a specific colleague within those practical hours.

Additionally, FIG. 5B also shows an external 510 tab. In one or more embodiments, the chronotype scheduling system 102 provides the external 510 tab to display the working hours and availability of externally involved users. In particular, external 510 refers to users outside of the individual user's organization. Specifically, external 510 can include users collaborating with the individual user from an outside company. Moreover, if applicable, the chronotype scheduling system 102 upon receiving a selection of external 510 can provide for display the scheduling timeline of one or more users.

Figure 6A:
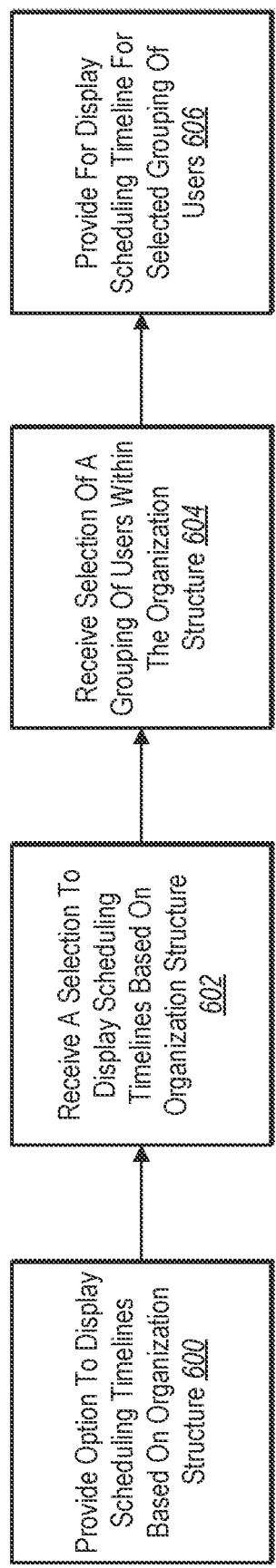
FIGS. 6A-6C illustrate an example diagram and graphical user interface for providing an option to display scheduling timelines based on organization structure in accordance with one or more embodiments.
Figure 6B:
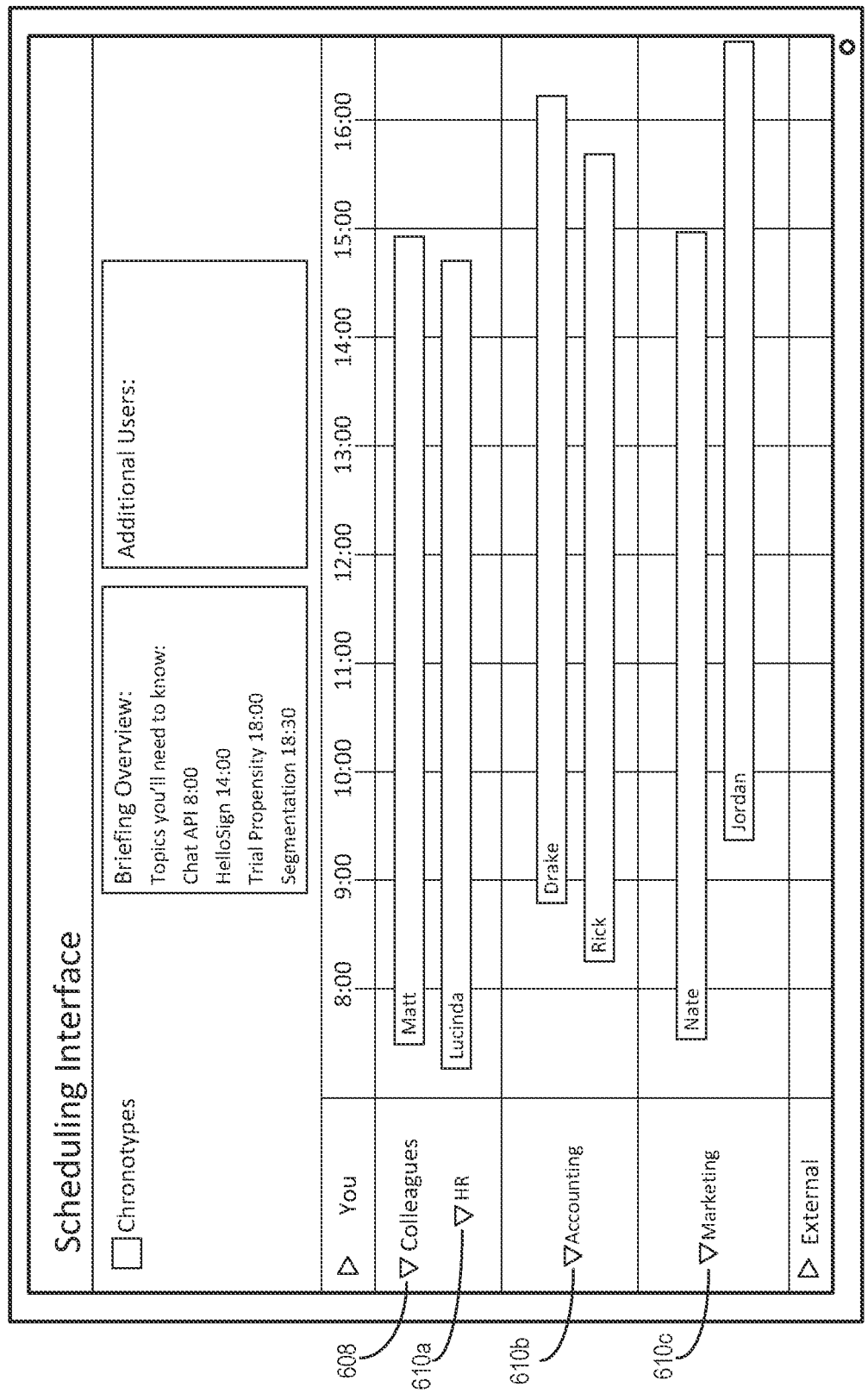

As mentioned above, the chronotype scheduling system 102 provides for an option to view scheduling timelines based on organization. For example, as shown in FIGS. 6A-6B the chronotype scheduling system 102 provides an option for displaying scheduling timeline based on organization structure via the graphical user interface. In particular, FIG. 6A shows the chronotype scheduling system 102 performing an act 600. Specifically, the act 600 includes provide an option to display scheduling timeline based on organization structure, organization structure was discussed previously. Moreover, the chronotype scheduling system 102 can provide an option via the graphical user interface of the scheduling interface (shown in FIG. 5B) to transition the graphical user interface display to a view based on organization structure.

As shown in FIG. 6A, in one or more embodiments, the chronotype scheduling system 102 performs an act 602. In particular, the act 602 includes receiving a selection to display scheduling timelines based on organization structure via selecting/swiping/clicking by the client device. For instance, when the chronotype scheduling system 102 receives the selection to display the scheduling timelines based on organization structure, the chronotype scheduling system 102 transitions the graphical user interface to display expandable tabs corresponding with various branches of the organization structure.

Further, as shown in FIG. 6A, the chronotype scheduling system 102 performs an act 604 that includes receiving a selection of a grouping of users within the organization structure. For instance, the act 604 of receiving a selection includes the individual user selecting one or more of the expandable tabs, wherein each of the expandable tabs include a corresponding branch identifier. Specifically, the chronotype scheduling system 102 identifies the corresponding branch identifier and expands the tab to display scheduling timelines that conform with the branch identifier. Moreover, as also shown in FIG. 6A, the chronotype scheduling system 102 performs an act 606. For example, the chronotype scheduling system 102 performs the act 606 of providing for display a scheduling timeline for selected groupings of users. In particular, the chronotype scheduling system 102 based on the act 604 and the above-mentioned branch identifier visually displays the selected grouping of users.

As illustrated, FIG. 6B shows the scheduling interface with various branches of an organization structure. For example, FIG. 6B shows colleagues 608 tab expanded downwards with sub-categories that correspond with branches of the organization structure. In particular, FIG. 6B shows branches 610a-610c of the organization structure. A first branch 610a includes the human resources department, a second branch 610b includes the accounting department, and a third branch 610c includes the marketing department. Furthermore, FIG. 6B illustrates each of the branches 610a-610c expanded to display various colleague scheduling timelines within each of the branches 610a-610c.

Figure 6C:
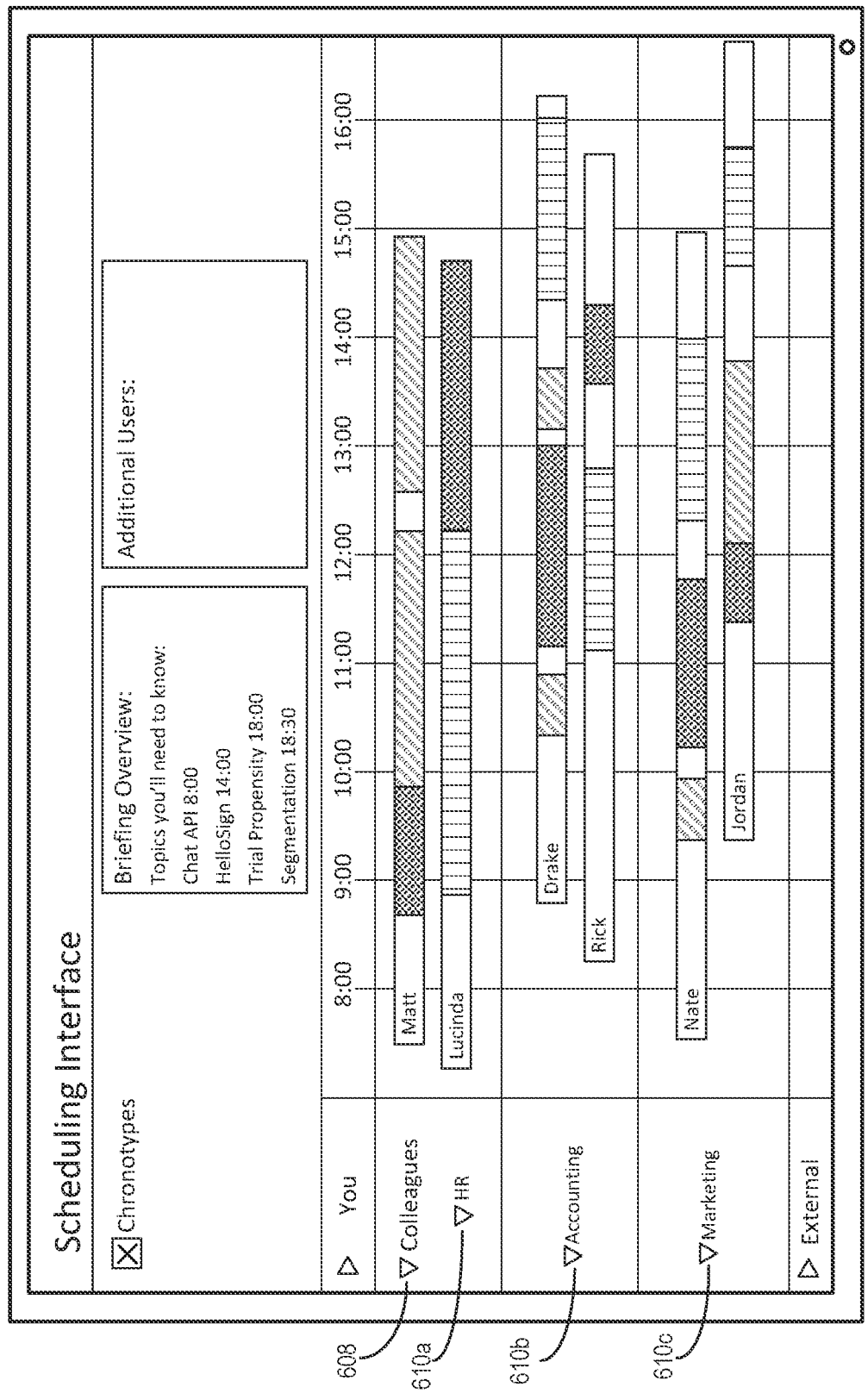

As illustrated, FIG. 6C shows the graphical user interface shown in FIG. 6B, however with chronotype visualization for each of the scheduling blocks. For example, FIG. 6C shows a selection of an option to display chronotypes. In particular, in response to a selection of the option to display chronotypes, the chronotype scheduling system 102 transitions the view shown in FIG. 6B to display various chronotype patterns for each of the colleague scheduling timelines shown in FIG. 6C. For instance, by selecting the chronotypes option, the chronotype scheduling system 102 assists the individual user of the scheduling interface to determine a potentially most appropriate time for scheduling a certain event. Moreover, FIG. 6C illustrates that for each of various views the chronotype scheduling system 102 offers, the chronotype scheduling system 102 also provides a corresponding chronotype view for displayed scheduling timelines.

Figure 7A:
FIGS. 7A-7B illustrate an example diagram and graphical user interface for providing an option to view availability blocks corresponding with scheduling timelines in accordance with one or more embodiments.
Figure 7B:
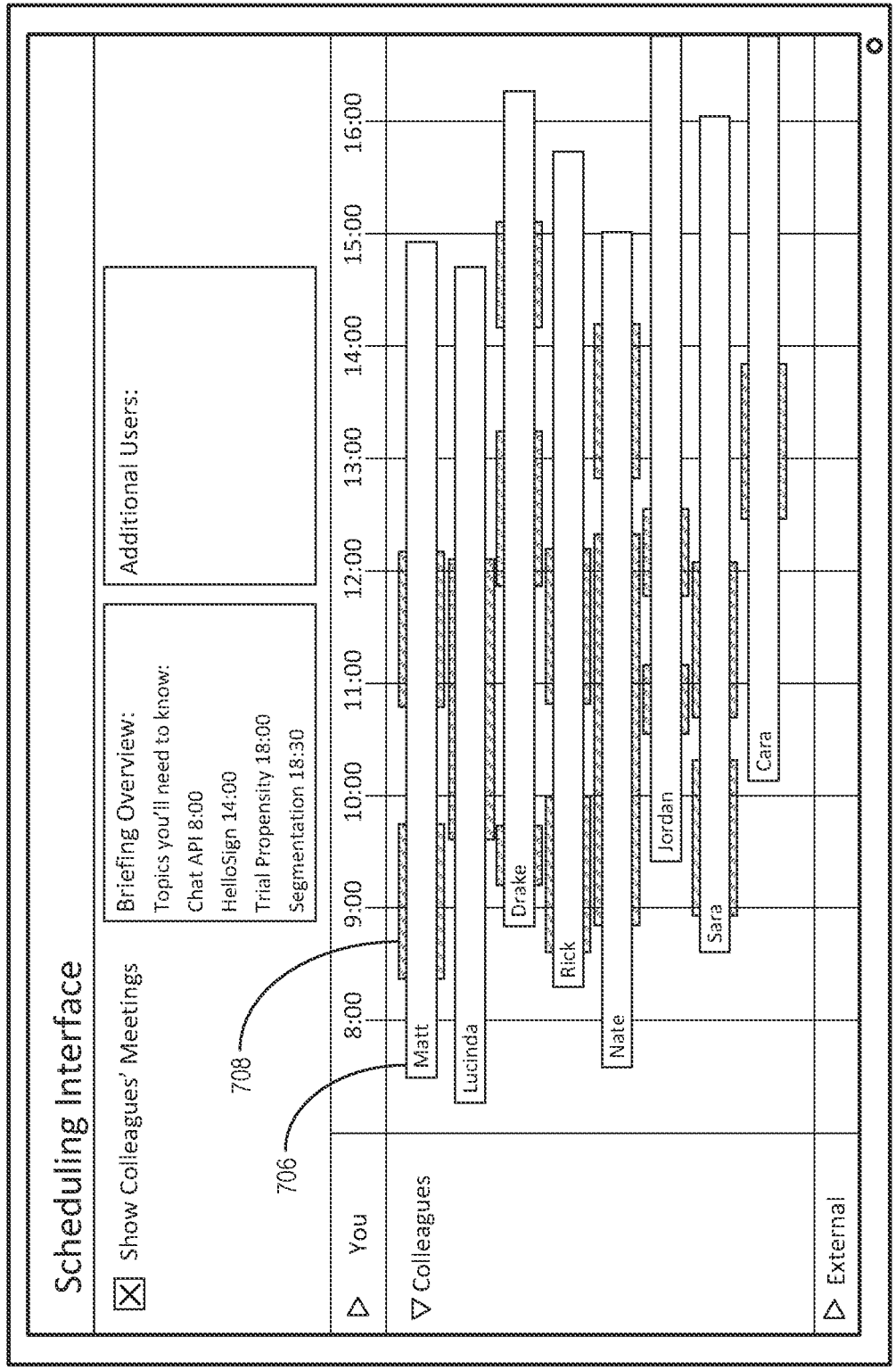

As mentioned above, the chronotype scheduling system 102 provides for display availability blocks in one or more embodiments. For example, FIGS. 7A-7B illustrates the chronotype scheduling system 102 providing a view of synchronous and asynchronous availability. In particular, FIG. 7A shows the chronotype scheduling system 102 performing an act 700 that includes providing an option to view availability blocks corresponding with scheduling timelines. Furthermore, for each of the various views provided by the chronotype scheduling system 102, the chronotype scheduling system 102 also provides an option to view availability blocks for corresponding scheduling timelines. In particular, the availability blocks provides for additional efficiency and accuracy in generating calendar events that includes various colleagues because in addition to viewing working hours and chronotypes, the individual user can also consider synchronous and asynchronous availability.

Further, FIG. 7A illustrates the chronotype scheduling system 102 performing an act 702. For example, the act 702 includes the chronotype scheduling system 102 receiving a selection to view scheduling timelines with availability blocks. In particular, the act 702 includes the individual user selecting/swiping/clicking the option to view the scheduling timeline with availability blocks. Moreover, the chronotype scheduling system 102 transitions the view of the scheduling timelines without availability blocks to the view with availability blocks without navigating to another graphical user interface.

Additionally, FIG. 7A illustrates the chronotype scheduling system 102 performing an act 704. For example, the act 704 includes providing a view of synchronous availability blocks and asynchronous availability blocks. In particular, the chronotype scheduling system 102 identifies synchronous and asynchronous availability. Specifically, synchronous availability involves a user being available in real-time to join a video call, a phone call, or an in-person meeting. Whereas asynchronous availability involves a user not necessarily responding in real-time. For example, asynchronous availability involves a user being able to respond to messages/emails. For instance, the chronotype scheduling system 102 can identify synchronous versus asynchronous availability based on a user status and/or an intelligent determination. For example, the chronotype scheduling system 102 determines synchronous versus asynchronous availability based on user status by providing an option to a user to indicate their status. In particular, the chronotype scheduling system 102 provides the user an option to indicate an availability to respond to messages/emails. In other instances, the chronotype scheduling system 102 determines synchronous versus asynchronous availability based on an intelligent determination by utilizing a machine learning model. In particular, the machine learning model receives as inputs various scheduled events, task topics corresponding to the scheduled events, and event participants (e.g., other users). Based on the received inputs, the machine learning model determines whether the user has synchronous or asynchronous availability.

As illustrated, FIG. 7B shows the chronotype scheduling system 102 providing for display the availability blocks within the scheduling interface. For example, FIG. 7B shows the scheduling interface with the option to "show colleagues' meetings" checked. In particular, the chronotype scheduling system 102 provides for display a first scheduling timeline 706 with an availability block 708. Specifically, FIG. 7B shows the availability block 708 that indicates asynchronous availability. Whereas the scheduling timelines without the availability block 708 indicates synchronous availability.

Figure 8:
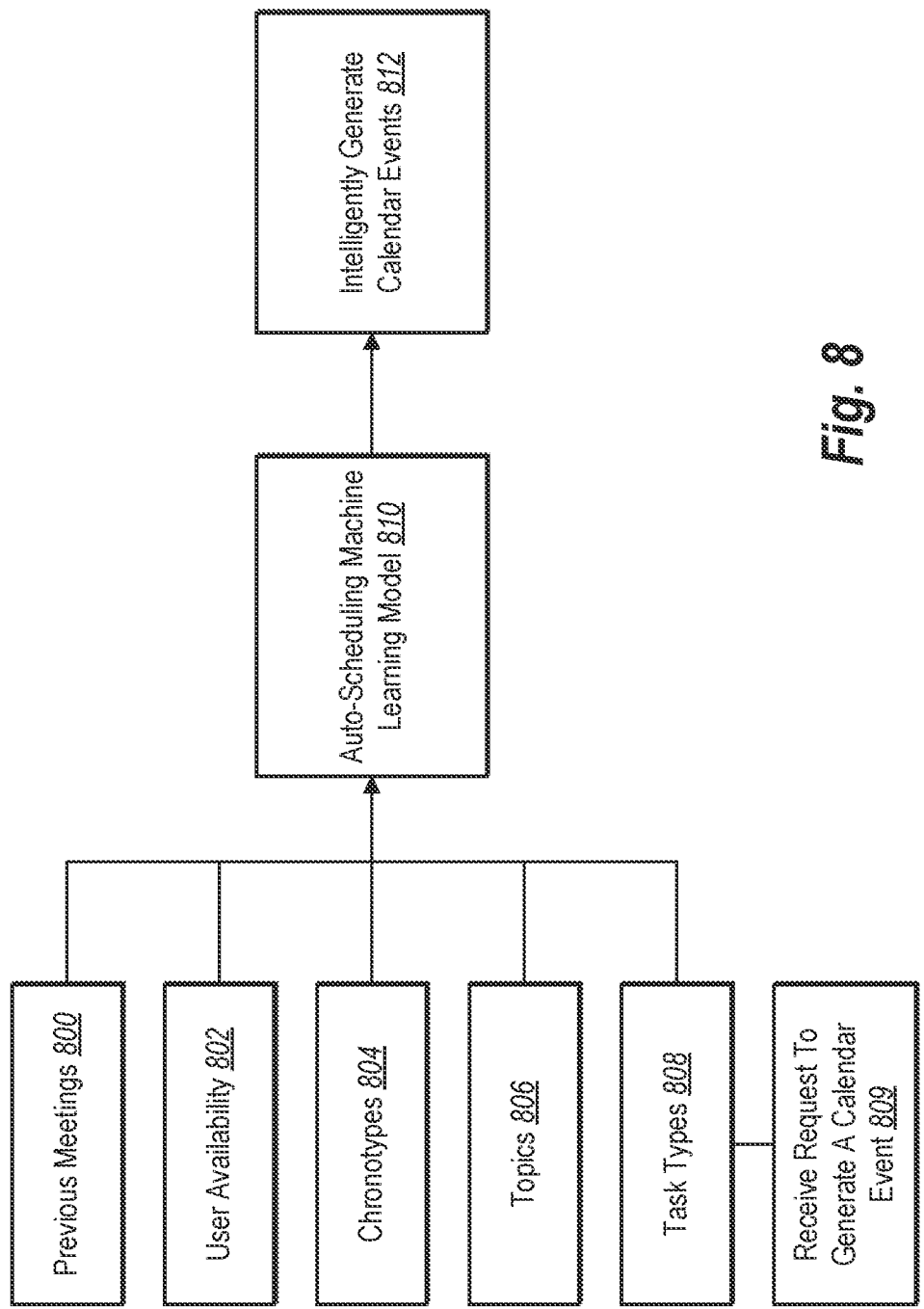
FIG. 8 illustrates an example diagram of intelligently generating calendar events in accordance with one or more embodiments.

As also mentioned above, the chronotype scheduling system 102 intelligently generates calendar events in accordance with one or more embodiments. For example, FIG. 8 illustrates an auto-scheduling machine learning model 810 receiving various inputs. In particular, the various inputs include previous meetings 800, user availability 802, chronotypes 804, topics 806, task types 808 linked to a request to generate a calendar event 809. Specifically, the chronotype scheduling system 102 utilizes the auto-scheduling machine learning model 810 in response to receiving a request to generate a calendar event 809 with an associated task type. For instance, a user selects an option to generate a calendar event that includes "one-on-one with Matt" and the task types 808 of the calendar event includes "analytical". Based on the task types 808, for the given illustration, the chronotype scheduling system 102 via the auto-scheduling machine learning model receives the request to generate the calendar event 809 and an analytical task type. Further, the auto-scheduling machine learning model 810 also receives topics 806 of "discuss engineering features of new product," a chronotype of "eveningness," user availability 802 associated with indicated users, and previous meetings 800 that include historical collaborations or calendar events generated by indicated users.

As just mentioned, the chronotype scheduling system 102 utilizes the auto-scheduling machine learning model 810. In particular, the chronotype scheduling system 102 can utilize the auto-scheduling machine learning model 810 to intelligently determine the most fitting time to generate a calendar event. For example, the auto-scheduling machine learning model can receive the aforementioned features, where a combination of the features can indicate the best time to schedule a calendar event. In particular, the chronotype scheduling system 102 can utilize the auto-scheduling machine learning model 810 to analyze various features and to encode the information, (e.g., using one hot encoding, an encoding layer, or a vector mapping) and then process the encoding utilizing the auto-scheduling machine learning model 810 to perform an act 812 of intelligently generating calendar events.

Furthermore, in one or more embodiments, the chronotype scheduling system 102 intelligently generates the calendar event and provides a suggestion to the user. For example, the chronotype scheduling system 102 provides a visual notification on the graphical user interface that suggests a day and time to conduct the calendar event. In particular, the chronotype scheduling system 102 also provides an option to accept or reject the suggestion made by the chronotype scheduling system 102.

Figure 9A:
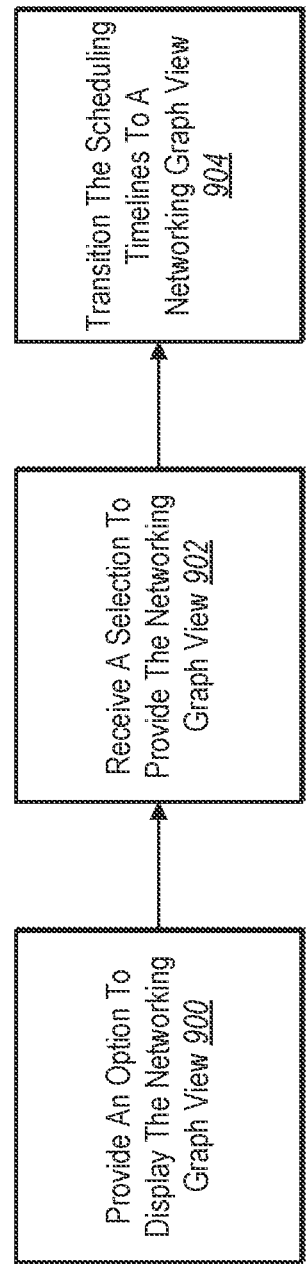
FIGS. 9A-9C illustrate an example diagram and graphical user interface for transitioning the scheduling timelines to a networking graph view in accordance with one or more embodiments.
Figure 9B:
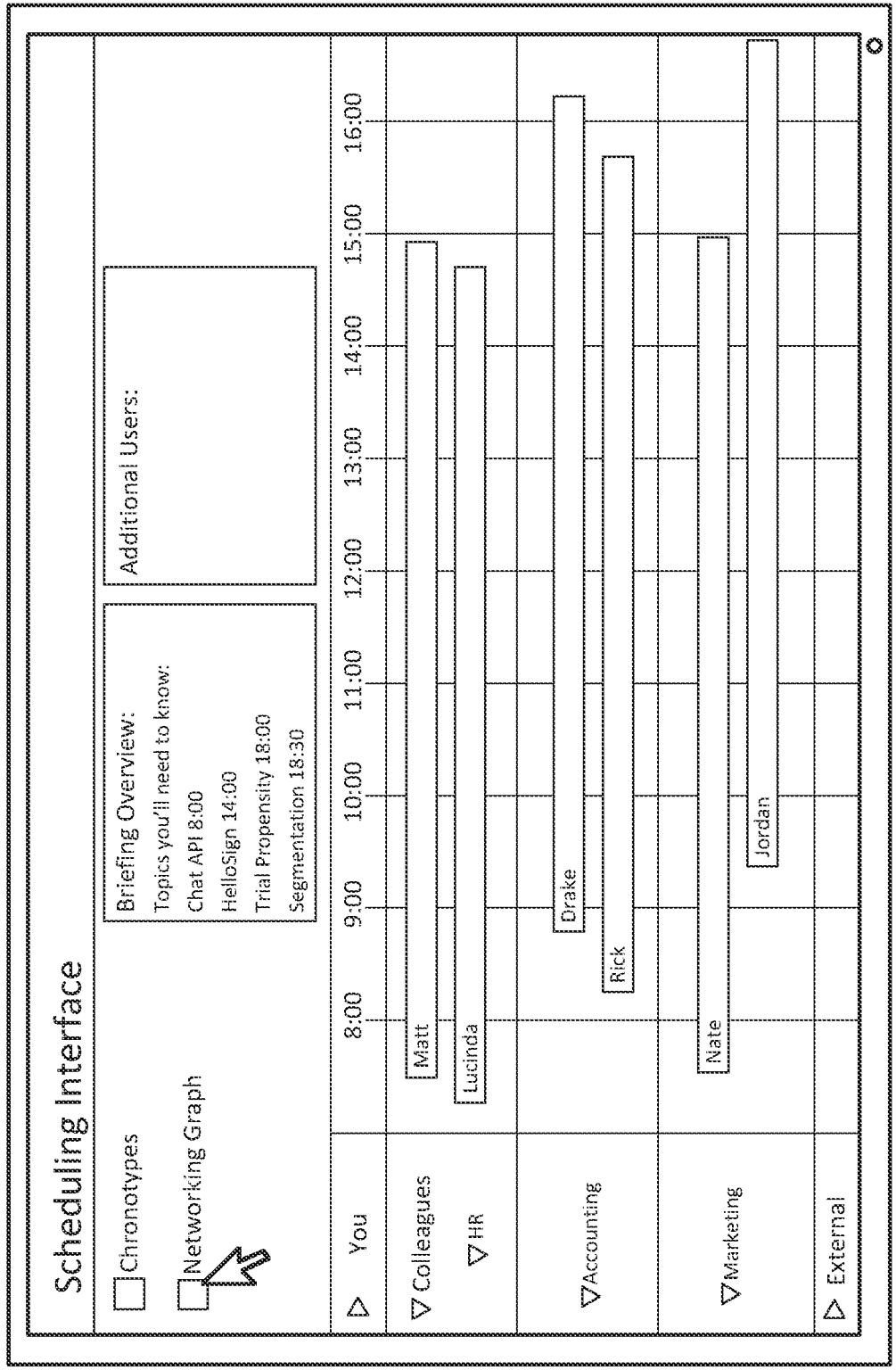

As mentioned, the chronotype scheduling system 102 also provides a networking graph view in accordance with one or more embodiments. As shown, FIGS. 9A-9B illustrates the chronotype scheduling system 102 transitioning the scheduling timelines to a networking graph view. For example, FIG. 9A shows the chronotype scheduling system 102 performing an act 900. In particular, the act 900 includes providing an option to display the networking graph view. For instance, for each of the various display provided by the chronotype scheduling system 102, the chronotype scheduling system 102 also provides an option to transition to view to the networking graph view.

As also shown, FIG. 9A also shows the chronotype scheduling system 102 performing an act 902. In particular, the act 902 includes receiving a selection to provide the networking graph view. For instance, receiving a selection includes selecting/swiping/clicking the option to transition to the networking graph view. For each of the elements present in the scheduling interface, the chronotype scheduling system 102 has a corresponding networking graph view identifier. As such, the chronotype scheduling system 102 utilizes the networking graph view identifiers to determine how to display the scheduling interface within the networking graph view.

Figure 9C:
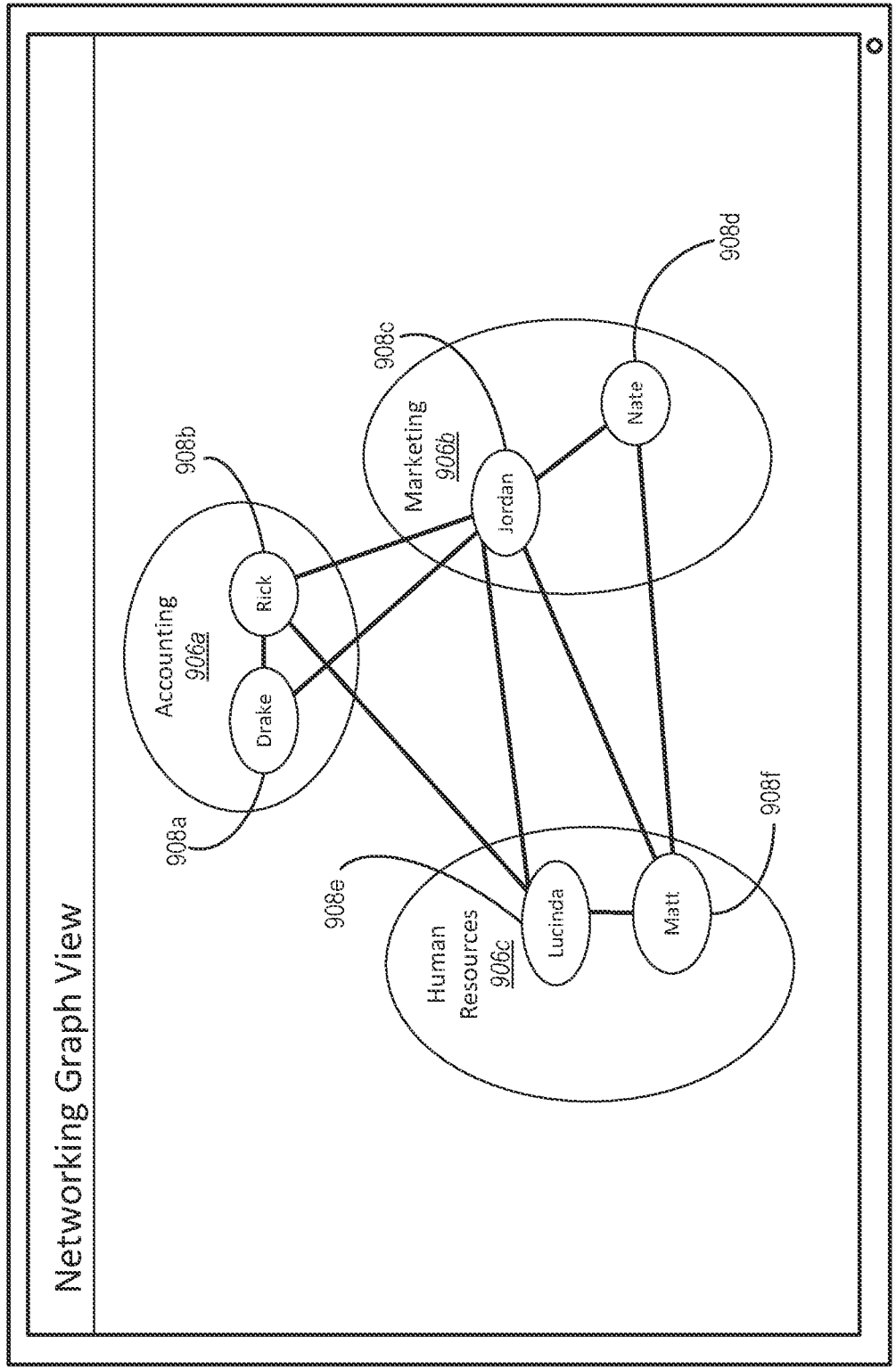

Further, FIG. 9A shows the chronotype scheduling system 102 performing an act 904 that includes transitioning the scheduling timelines to a networking graph view based on the aforementioned identifiers that correspond with a visual element of the networking graph view. For example, FIG. 9B shows the graphical user interface of the scheduling interface. In particular, FIG. 9B shows the initial scheduling interface display and a user selecting the networking graph view. Furthermore, based on the selection shown in FIG. 9B, the chronotype scheduling system 102 transitions to the graphical user interface shown in FIG. 9C. In particular, FIG. 9C shows different branches of the organization structure with relevant users. For instance, FIG. 9C shows accounting 906*a* with Drake 908*a* and Rick 908*b*, marketing 906*b* with Jordan 908*c* and Nate 908*d*, and human resources 906*c* with Lucinda 908*e* and Matt 908*f*. Moreover, FIG. 9C also shows various connections between users. Specifically, the connections between users represents prior, present, and future collaborations between the users, which can assist a user in determining whether a particular user should be involved in a potential calendar event.

Figure 10A:
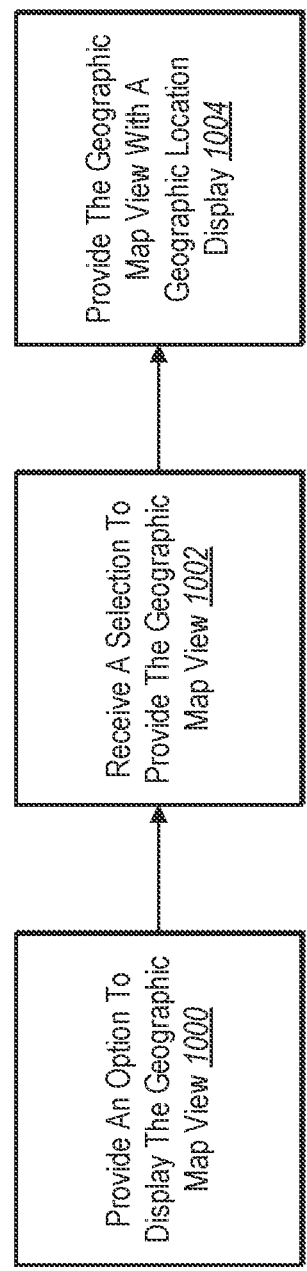
FIGS. 10A-10C illustrate an example diagram and graphical user interface for transitioning the scheduling timelines to a geographic map view in accordance with one or more embodiments.

Similar to FIGS. 9A-9C, FIGS. 10A-10C also provides an alternative view of the scheduling interface, however, the alternative view is for a geographic map view. For example, FIG. 10A illustrates the chronotype scheduling system 102 performing an act 1000 of providing an option to display the geographic map view. Further, the chronotype scheduling system 102 performs an act 1002 of receiving a selection to provide the geographic map view and an act 1004 of providing the geographic map view with a geographic location display. Similar to FIG. 9B, FIG. 10B also display the graphical user interface of the scheduling interface and an option to select the map view. As iterated above, the chronotype scheduling system 102 provides various viewing options for the scheduling interface. In various embodiments, the chronotype scheduling system 102 provides both the map view and the networking graph view as options.

Figure 10B:
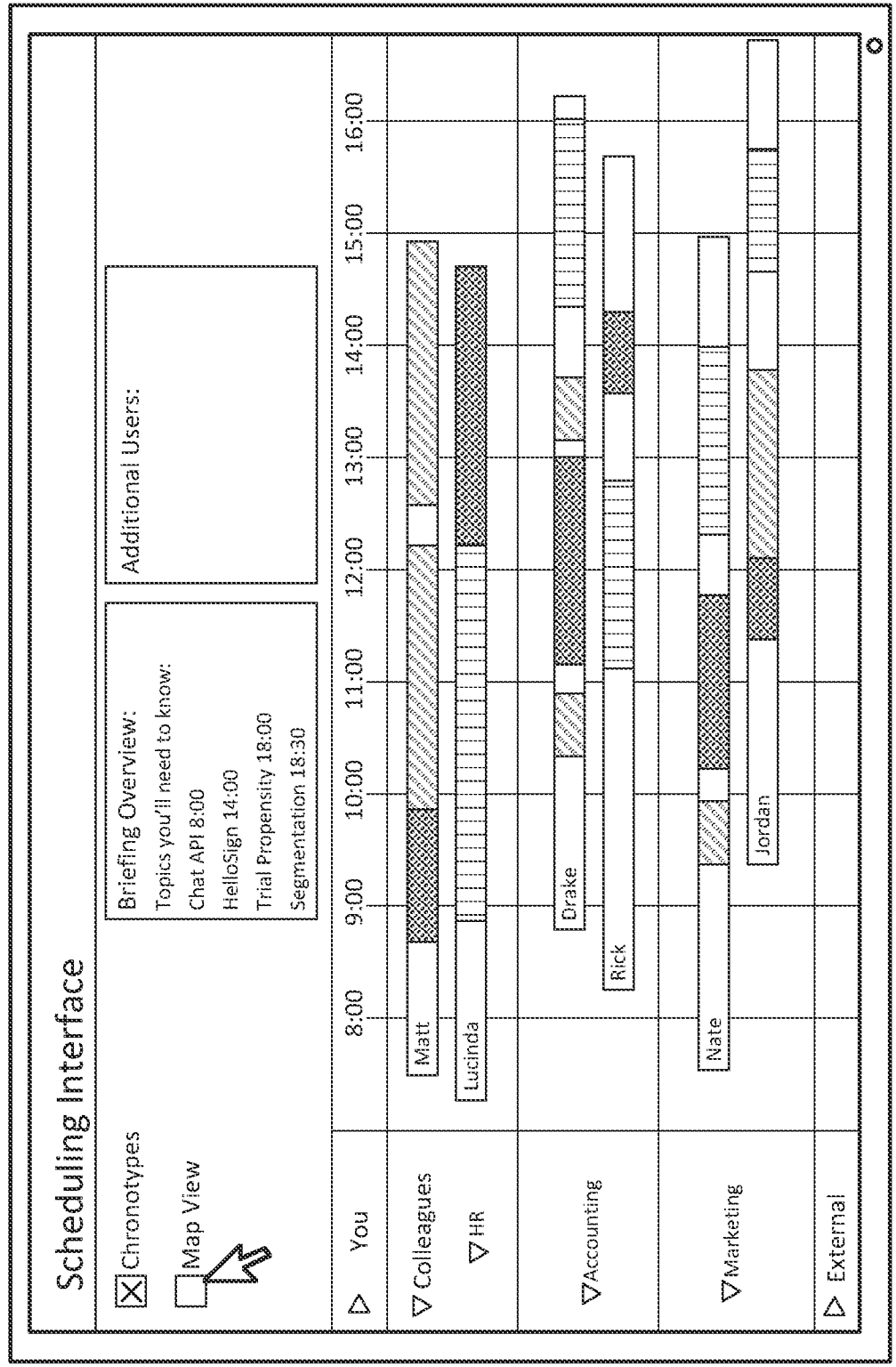
Figure 10C:
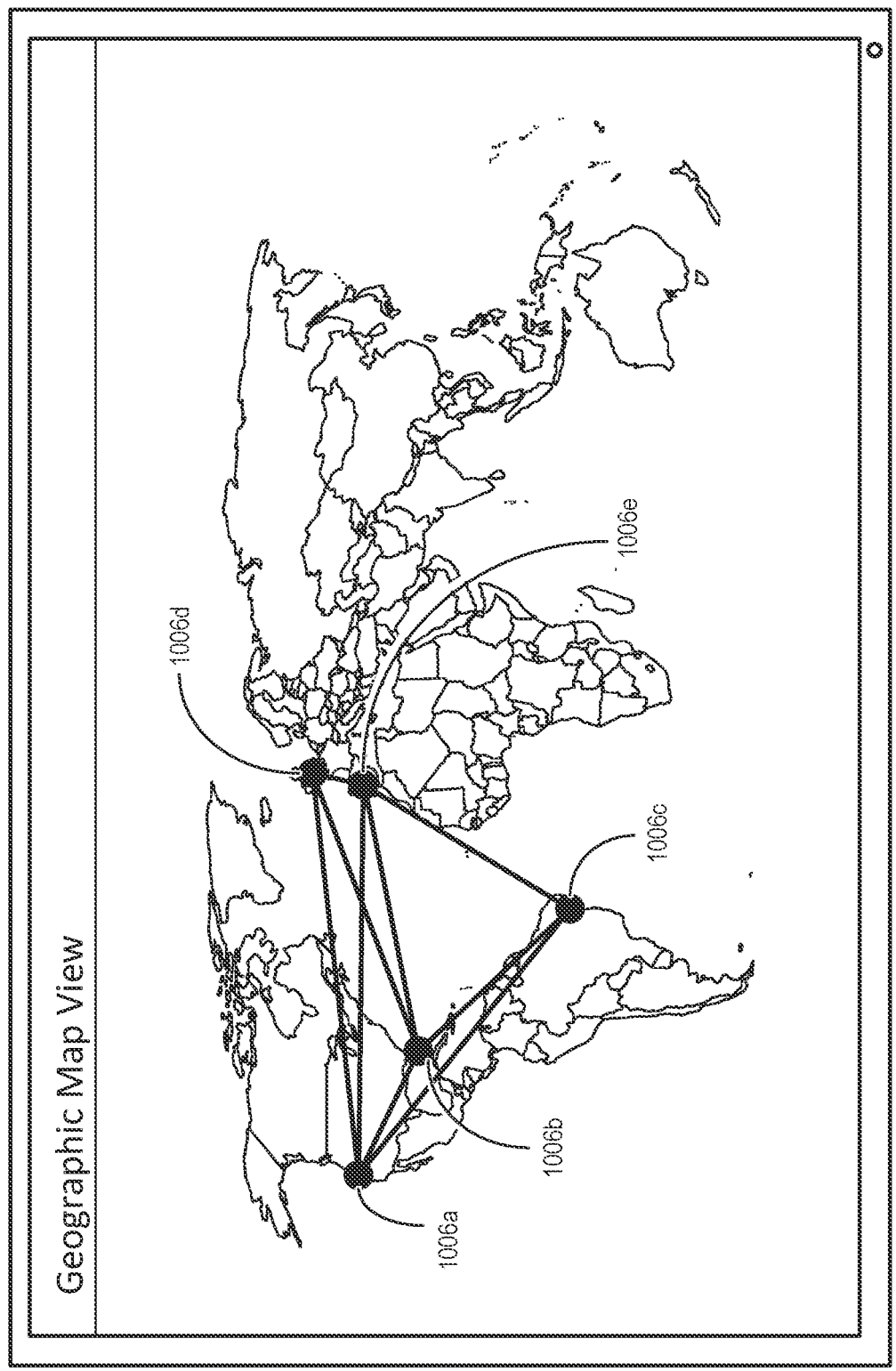

As further illustrated, FIG. 10C shows the transition from FIG. 10B of the scheduling interface to the geographic map view. For example, FIG. 10C shows various users 1006*a*-1006*e* visually connected to one another on a geographic map. In particular, the connections in FIG. 10C represent collaborations between various users and can assist users to identify expertise for certain meetings in specific geographic locations. Additionally, the geographic map view can also assist users to identify whether certain geographic regions would benefit from being included in a meeting.

Although the chronotype scheduling system 102 shows the networking graph view and the geographic map view as illustrated in FIGS. 9C and 10C, in one or more embodiments, the chronotype scheduling system 102 can utilize alternative embodiments. For example, the chronotype scheduling system 102 can visually show the networking graph view and the geographic map view side-by-side. Further, in other embodiments, the chronotype scheduling system 102 shows one of the networking graph view or the geographic map view side-by-side with the scheduling interface shown in FIGS. 9B and 10B.

Figure 11:
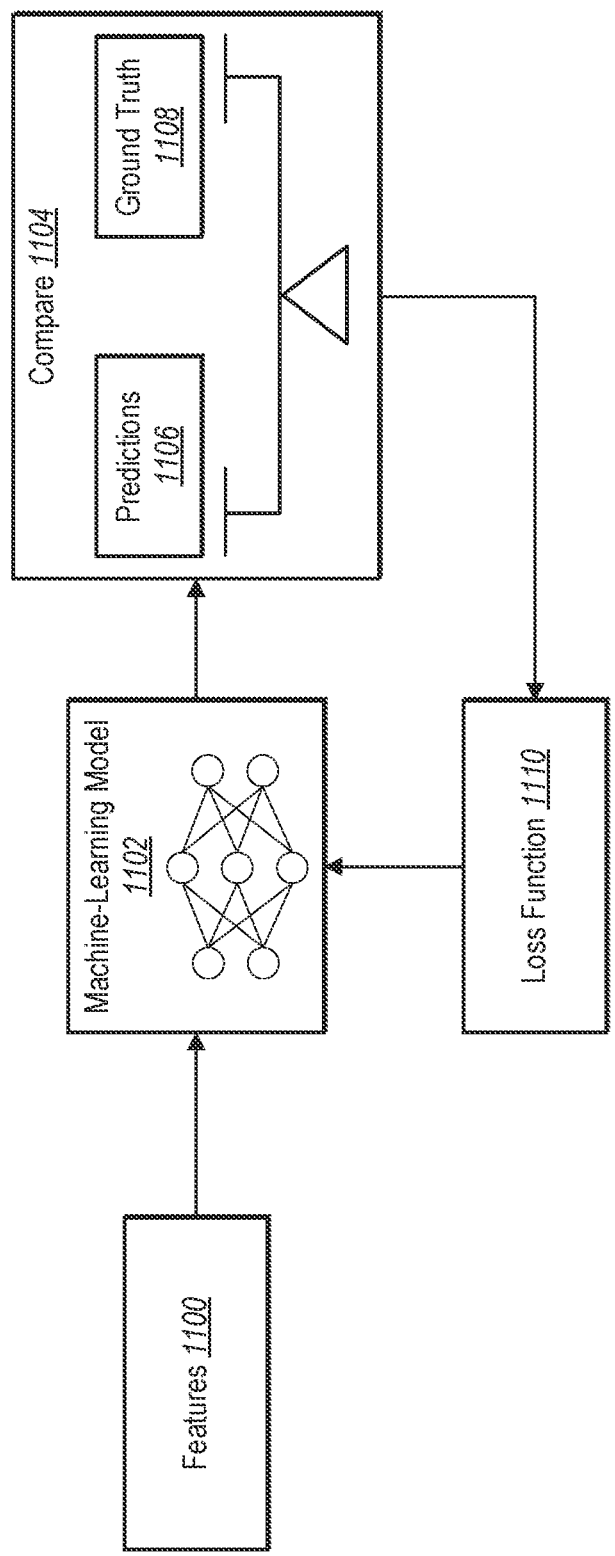
FIG. 11 illustrates an example diagram of training a machine-learning model in accordance with one or more embodiments.

As mentioned above, the chronotype scheduling system 102 utilizes various machine-learning models for determining, for example, chronotypes, auto-scheduling, intelligent briefing, and availability. As shown, FIG. 11 illustrates training a machine learning model 1102. For example, FIG. 11 illustrates the machine learning model 1102 receiving as input features 1100. As part of training the machine learning model 1102, the chronotype scheduling system 102 performs a comparison 1104. Specifically, the chronotype scheduling system 102 compares generated predictions 1106 with a ground truth 1108. Indeed, the chronotype scheduling system 102 accesses the ground truth 1108 from a database, where the ground truth 1108 is designated as corresponding to sample data. In some cases, the chronotype scheduling system 102 performs the comparison 1104 using a loss function 1110 such as a mean squared error loss function or a cross entropy loss function to determine an error, or a measure of loss associated with the machine learning model 1102 (or between the generated predictions 1106 and the ground truth 1108).

In one or more embodiments, the chronotype scheduling system 102 further performs a parameter modification. Based on the comparison 1104, the chronotype scheduling system 102 modifies parameters of the machine learning model 1102. For example, the chronotype scheduling system 102 modifies parameters of the machine learning model 1102 to reduce a measure of error or a loss associated with the machine learning model 1102. The chronotype scheduling system 102 can further repeat the process illustrated in FIG. 11 for many iterations or epochs until the machine learning model 1102 satisfies a threshold measure of loss. For each iteration, the chronotype scheduling system 102 generates new predictions from new sample data, performs a comparison, and modifies parameters (e.g., via back propagation) to improve predictions for subsequent iterations.

The components of the chronotype scheduling system 102 can include software, hardware, or both. For example, the components of the chronotype scheduling system 102 can include one or more instructions stored on a computer-readable storage medium and executable by processors of one or more computing devices. When executed by one or more processors, the computer-executable instructions of the chronotype scheduling system 102 can cause a computing device to perform the methods described herein. Alternatively, the components of the chronotype scheduling system 102 can comprise hardware, such as a special purpose processing device to perform a certain function or group of functions. Additionally, or alternatively, the components of the chronotype scheduling system 102 can include a combination of computer-executable instructions and hardware.

Furthermore, the components of the chronotype scheduling system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the chronotype scheduling system 102 may be implemented as part of a stand-alone application on a personal computing device or a mobile device.

FIGS. 1-11, the corresponding text, and the examples provide a number of different systems and methods for generating calendar events and determining chronotypes. In addition to the foregoing, implementations can also be described in terms of flowcharts comprising acts steps in a method for accomplishing a particular result. For example, FIG. 12 illustrates an example series of acts for generating a calendar event for a subset of users.

Figure 12:
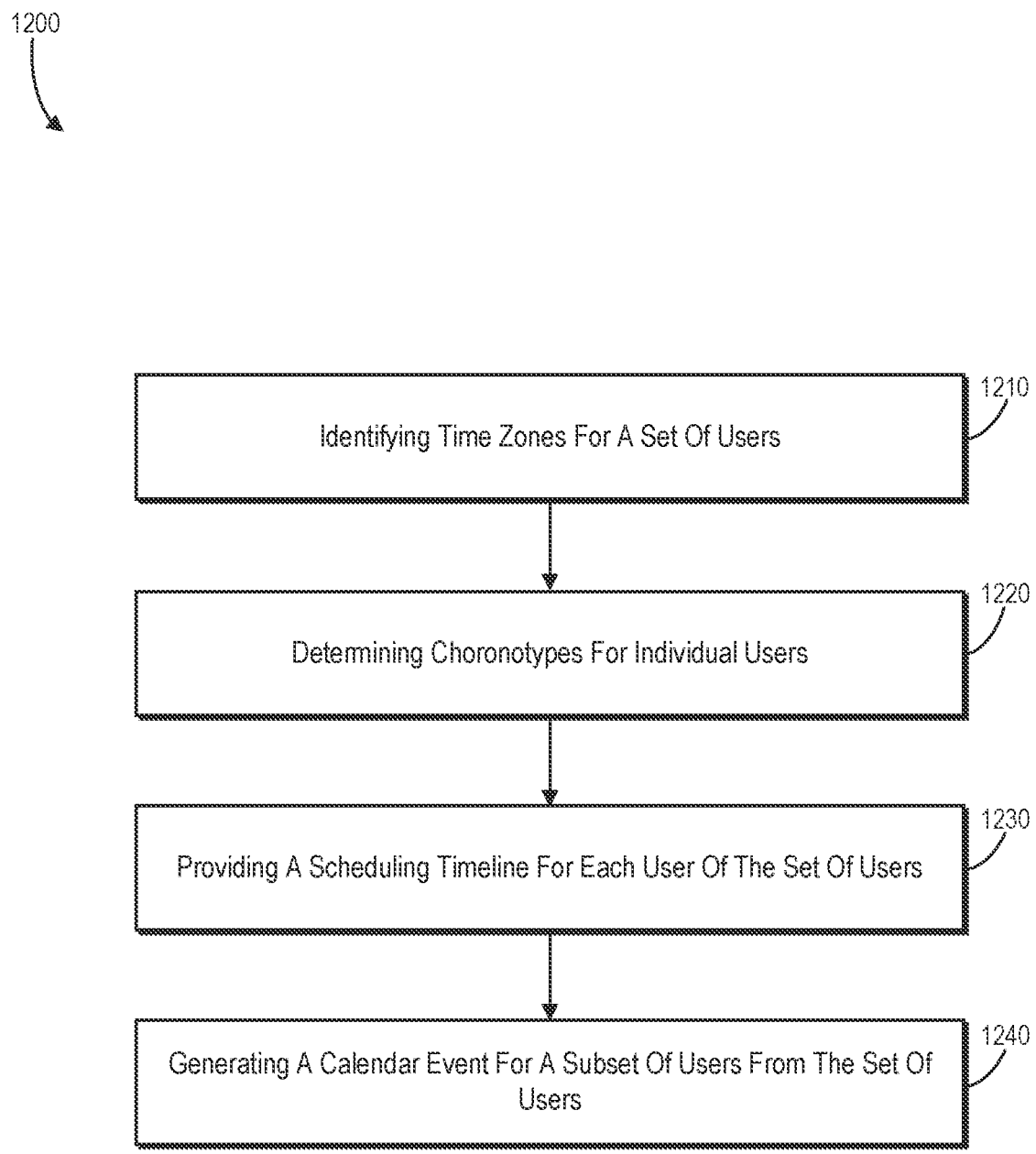
FIG. 12 illustrates an example series of acts for generating a calendar event in accordance with one or more embodiments.

While FIG. 12 illustrates acts according to certain implementations, alternative implementations may omit, add to, reorder, and/or modify any of the acts shown in FIG. 12. The acts of FIG. 12 can be performed as part of a method. Alternatively, a non-transitory computer-readable medium can comprise instructions, that when executed by one or more processors, cause a computing device to perform the acts of FIG. 12. In still further implementations, a system can perform the acts of FIG. 12.

As illustrated in FIG. 12, a series of acts 1200 may include an act 1210 of identifying time zones for a set of users. Further, the act 1210 also includes identifying time zones for a set of users associated with client devices in different geographic locations. The series of acts 1200 may include an act 1220 of determining chronotypes for each user. Additionally, the act 1220 also includes determining chronotypes for each user within the set of users. The series of acts 1200 may include an act 1230 of providing a scheduling timeline for each user of the set of users. Further, the act 1230 includes providing, for display within a scheduling interface presented on a client device, a scheduling timeline for each user of the set of users, each scheduling timeline indicating a corresponding time zone and visually representing the chronotypes of each user of the set of users. The series of acts 1200 may also include an act 1240 of generating a calendar event for a subset of users from the set of users. Moreover, the act 1240 includes based on receiving a user interaction within the scheduling interface, generating a calendar event for a subset of users from the set of users based on the time zones and the chronotypes for each user within the subset of users.

The series of acts 1200-1240 also includes identifying at least one of: individual user responses to questionnaires, a collaboration history, individual user work times corresponding with work categories, or historical productivity measures. Further, the series of acts 1200-1240 includes utilizing a chronotype machine learning model. In one or more embodiments, the series of acts 1200-1240 includes determining a first chronotype for a first user within the set of users, determining a second chronotype for a second user within the set of users, and generating a visual representation of the chronotype for the first chronotype for the first user and the second chronotype for the second user.

The series of acts 1200-1240 also includes generating a first pattern for the first chronotype of the first user, generating a second pattern for the second chronotype of the second user, and wherein the first pattern and second pattern indicate preference periods to perform task types within the scheduling interface for the first user and the second user. Furthermore, the series of acts 1200-1240 includes providing the scheduling timelines for all selected users within the set of users without navigating to another interface.

The series of acts 1200-1240 also includes providing an option within the scheduling interface for finding one or more experts for a topic within the set of users. Further, the acts 1200-1240 include receiving a selection of the option for finding the one or more experts for the topic within the set of users, identifying the one or more experts for the topic within the set of users, and providing for display within the scheduling interface, scheduling timelines for the identified one or more experts for the topic, the scheduling timelines indicating the time zones and visually representing the chronotypes of the identified one or more experts for the topic.

The series of acts 1200-1240 also includes providing an option within the scheduling interface for displaying an additional scheduling timeline associated with an additional user, receiving a selection of the option for displaying the additional scheduling timeline associated with the additional user, and in response to receiving a selection for displaying the additional scheduling timeline associated with the additional user, providing for display the additional scheduling timeline associated with the additional user.

The series of acts 1200-1240 also includes providing an option within the scheduling interface for displaying scheduling timelines based on an organization structure, based on receiving a selection of the option for displaying scheduling timelines based on the organization structure, providing for display within the scheduling interface, expandable elements for groupings of users within the organization structure, and in response to receiving a selection of a grouping of users from within the organization structure, providing for display scheduling timelines for the selected grouping of users.

The series of acts 1200-1240 also includes providing an option within the scheduling interface to transition the scheduling timelines to a networking graph view, wherein the networking graph view comprises a visual display of a first user within the subset of users connected to a second user within the subset of users. Moreover, the series of acts 1200-1240 includes providing an option within the scheduling interface to transition the scheduling timelines to a geographic map view, wherein the geographic map view comprises a visual geographic location display of a first user within the subset of users connected to a second user within the subset of users.

The series of acts 1200-1240 additionally includes determine chronotypes, utilizing a chronotype machine learning model, for each user within the set of users and based on receiving a user interaction within the scheduling interface, generate a calendar event for a subset of users from the set of users based on the time zones and the chronotypes for each user of within the set of users, without navigating to another interface. Further, the acts 1200-1240 also include provide for display scheduling timelines for the subset of users with a quick link corresponding with each scheduling timeline, wherein the quick link routes the user to a communication application and provide scheduling timelines for the subset of users that indicates availability blocks for the subset of users. Moreover, the acts 1200-1240 also include display for the scheduling timelines for the subset of users, indications of synchronous availability blocks and asynchronous availability blocks of the subset of users.

The series of acts 1200-1240 additionally includes identify topics corresponding with the calendar event, based on the identified topics, intelligently determining a briefing overview, and provide the briefing overview within the scheduling interface presented on the client device. Further the series of acts 1200-1240 include intelligently generate calendar events, utilizing an auto-scheduling machine learning model, based on at least one of previous meetings, user availability within the set of users, chronotypes, task types or topics. Moreover, the series of acts 1200-1240 intelligently resolve calendar event conflicts based on user availability within the set of users and chronotypes.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
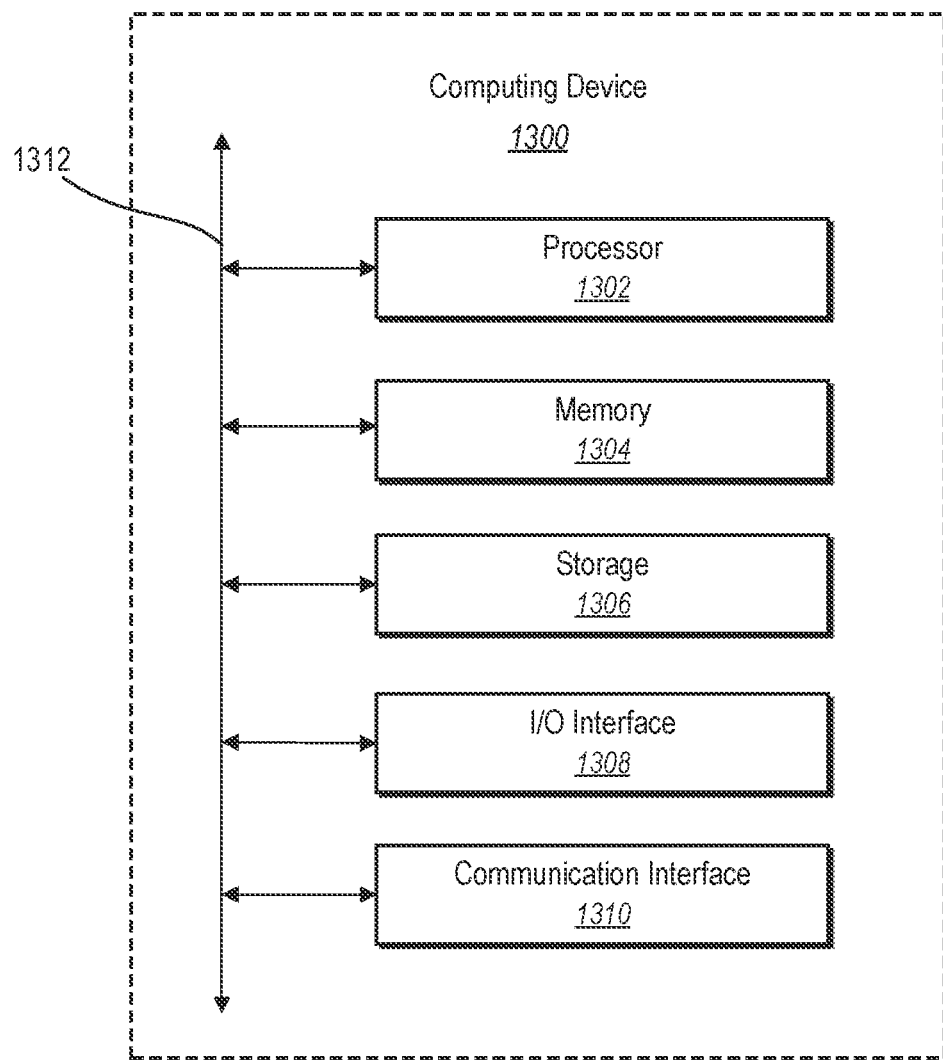
FIG. 13 illustrates a block diagram of a computing device for implementing one or more embodiments of the present disclosure.

FIG. 13 illustrates a block diagram of exemplary computing device 1300 (e.g., the server(s) 104 and/or the client device 108a-108n) that may be configured to perform one or more of the processes described above. One will appreciate that server(s) 104 and/or the client device 108a-108n may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example, and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example, and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 14:
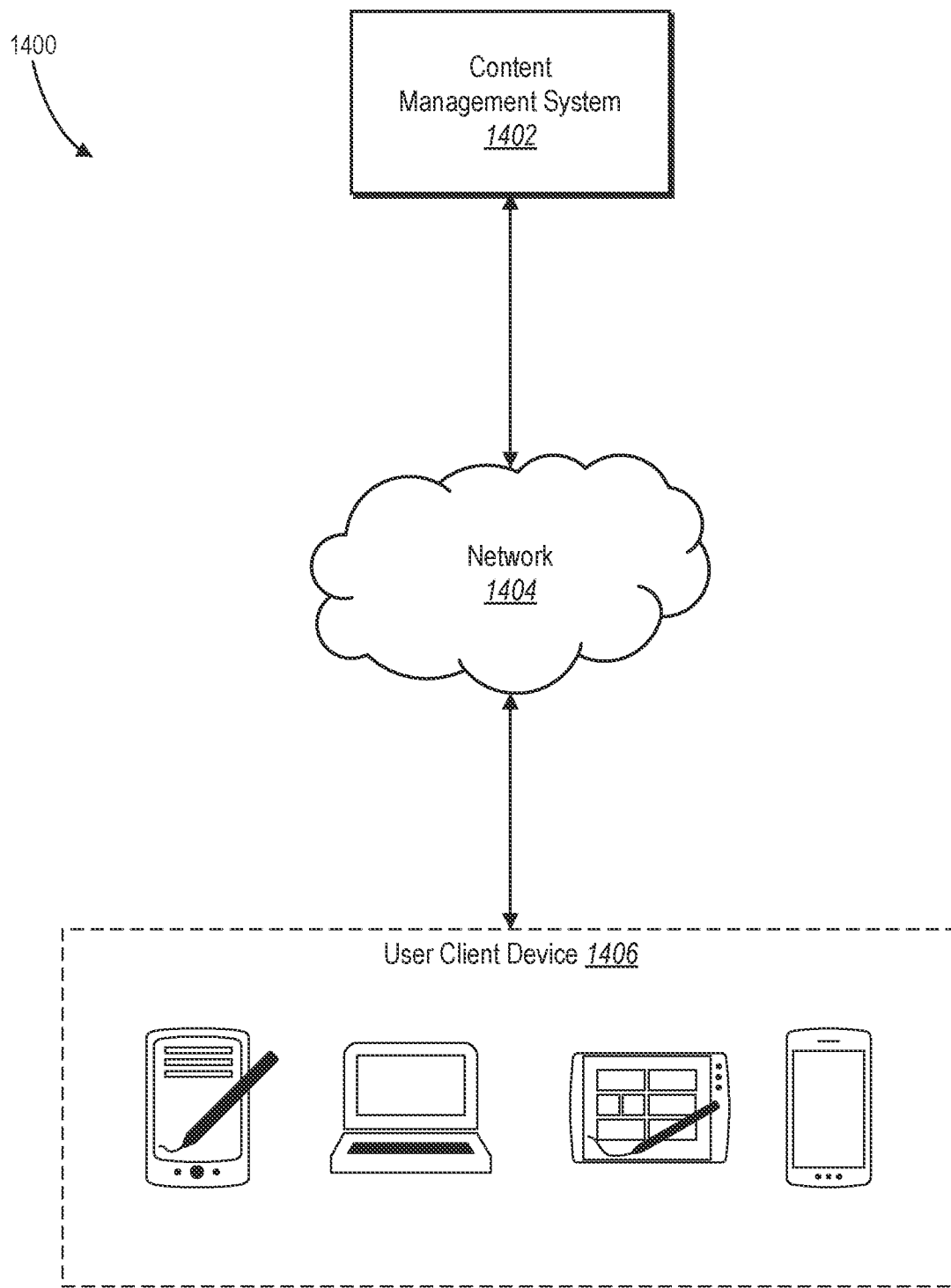
FIG. 14 illustrates an example environment for the chronotype scheduling system in accordance with one or more embodiments.

FIG. 14 is a schematic diagram illustrating environment 1400 within which one or more implementations of the chronotype scheduling system 102 can be implemented. For example, the chronotype scheduling system 102 may be part of a content management system 1402 (e.g., the content management system 106). Content management system 1402 may generate, store, manage, receive, and send digital content (such as digital content items). For example, content management system 1402 may send and receive digital content to and from client devices 1406 by way of network 1404. In particular, content management system 1402 can store and manage a collection of digital content. Content management system 1402 can manage the sharing of digital content between computing devices associated with a plurality of users. For instance, content management system 1402 can facilitate a user sharing a digital content with another user of content management system 1402.

In particular, content management system 1402 can manage synchronizing digital content across multiple client devices 1406 associated with one or more users. For example, a user may edit digital content using client device 1406. The content management system 1402 can cause client device 1406 to send the edited digital content to content management system 1402. Content management system 1402 then synchronizes the edited digital content on one or more additional computing devices.

In addition to synchronizing digital content across multiple devices, one or more implementations of content management system 1402 can provide an efficient storage option for users that have large collections of digital content. For example, content management system 1402 can store a collection of digital content on content management system 1402, while the client device 1406 only stores reduced-sized versions of the digital content. A user can navigate and browse the reduced-sized versions (e.g., a thumbnail of a digital image) of the digital content on client device 1406. In particular, one way in which a user can experience digital content is to browse the reduced-sized versions of the digital content on client device 1406.

Another way in which a user can experience digital content is to select a reduced-size version of digital content to request the full- or high-resolution version of digital content from content management system 1402. In particular, upon a user selecting a reduced-sized version of digital content, client device 1406 sends a request to content management system 1402 requesting the digital content associated with the reduced-sized version of the digital content. Content management system 1402 can respond to the request by sending the digital content to client device 1406. Client device 1406, upon receiving the digital content, can then present the digital content to the user. In this way, a user can have access to large collections of digital content while minimizing the amount of resources used on client device 1406.

Client device 1406 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1406 may access content management system 1402.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying time zones for a set of users associated with a set of client devices in different geographic locations;
   generating chronotypes for each user within the set of users from extracting data from the set of client devices;
   generating visual representations of the chronotypes for each user within the set of users, wherein the visual representations indicate chronotype patterns for the set of users associated with the set of client devices;
   providing, for display within a scheduling interface presented on a scheduling application of a client device, a scheduling timeline for each user of the set of users, a corresponding time zone and a visual representation with a chronotype pattern of each user of the set of users; and
   based on receiving a user interaction within the scheduling interface, generating a calendar event request for a subset of users from the set of users; and
   in response to the calendar event request, generating, utilizing an auto-scheduling machine learning model to process the time zones and the chronotypes for each user within the subset of users, a calendar event for the subset of users from the set of users.

2. The computer-implemented method of claim 1, wherein determining chronotypes for each user further comprises identifying at least one of: individual user responses to questionnaires, a collaboration history, individual user work times corresponding with work categories, or historical productivity measures.

3. The computer-implemented method of claim 1, wherein determining chronotypes for each user further comprises utilizing a chronotype machine learning model.

4. The computer-implemented method of claim 1, wherein determining chronotypes for each user further comprises:
   determining a first chronotype for a first user within the set of users;
   determining a second chronotype for a second user within the set of users; and
   generating a first visual representation of the first chronotype for the first user and a second visual representation of the second chronotype for the second user.

5. The computer-implemented method of claim 4, wherein generating the first visual representation of the first chronotype and the second visual representation of the second chronotype further comprises:
   generating a first pattern for the first chronotype of the first user; and
   generating a second pattern for the second chronotype of the second user,
   wherein the first pattern and the second pattern indicate preference periods associated with task types within the scheduling interface.

6. The computer-implemented method of claim 1, wherein providing, for display, the scheduling timeline further comprises providing the scheduling timeline for all selected users within the set of users without navigating to another interface.

7. The computer-implemented method of claim 1, wherein providing, for display, the scheduling timeline further comprises:
   providing an option within the scheduling interface for finding one or more experts for a topic within the set of users;
   receiving a selection of the option for finding the one or more experts for the topic within the set of users;
   identifying the one or more experts for the topic within the set of users; and
   providing for display within the scheduling interface, scheduling timelines for the identified one or more experts for the topic, the scheduling timelines indicating the time zones and visually representing the chronotypes of the identified one or more experts for the topic.

8. The computer-implemented method of claim 1, wherein providing, for display, the scheduling timeline further comprises:
   providing an option within the scheduling interface for displaying an additional scheduling timeline associated with an additional user;
   receiving a selection of the option for displaying the additional scheduling timeline associated with the additional user; and
   in response to receiving a selection for displaying the additional scheduling timeline associated with the additional user, providing for display the additional scheduling timeline associated with the additional user.

9. The computer-implemented method of claim 1, wherein providing, for display, the scheduling timeline further comprises:
   providing an option within the scheduling interface for displaying scheduling timelines based on an organization structure;
   based on receiving a selection of the option for displaying scheduling timelines based on the organization structure, providing for display within the scheduling interface, expandable elements for groupings of users within the organization structure; and
   in response to receiving a selection of a grouping of users from within the organization structure, providing for display scheduling timelines for the selected grouping of users.

10. The computer-implemented method of claim 1, wherein providing, for display, the scheduling timeline further comprises providing an option within the scheduling interface to transition the scheduling timeline to a networking graph view, wherein the networking graph view comprises a visual display of a first user within the subset of users connected to a second user within the subset of users.

11. The computer-implemented method of claim 1, wherein providing, for display, the scheduling timeline further comprises providing an option within the scheduling interface to transition the scheduling timeline to a geographic map view, wherein the geographic map view comprises a visual geographic location display of a first user within the subset of users connected to a second user within the subset of users.

12. A system comprising:
    at least one processor; and
    a non-transitory computer-readable medium comprising instructions that, when executed by the at least one processor, cause the system to:
       identify time zones for a set of users associated with a set of client devices in different geographic locations;
       generate chronotypes, utilizing a chronotype machine learning model, for each user within the set of users from extracting data from the set of client devices;
       generate visual representations of the chronotypes for each user within the set of users, wherein the visual representations indicate chronotype patterns for the set of users associated with the set of client devices;
       provide, for display within a scheduling interface presented on a scheduling application of a client device, a scheduling timeline for each user of the set of users, a corresponding time zone and a visual representation with a chronotype pattern of each user of the set of users;
       based on receiving a user interaction within the scheduling interface, generate a calendar event request for a subset of users from the set of users; and
       in response to the calendar event request, generate, utilizing an auto-scheduling machine learning model to process the time zones and the chronotypes for each user within the subset of users, a calendar event for the subset of users from the set of users.

13. The system of claim 12, further comprising instructions that, when executed by the at least one processor, cause the system to provide for display each scheduling timeline for the subset of users with a quick link corresponding with each scheduling timeline, wherein the quick link routes to a communication application.

14. The system of claim 12, further comprising instructions that, when executed by the at least one processor, cause the system to provide each scheduling timeline for the subset of users that indicate availability blocks for the subset of users.

15. The system of claim 12, further comprising instructions that, when executed by the at least one processor, cause the system to display, within each scheduling timeline for the subset of users, indications of synchronous availability blocks and asynchronous availability blocks for each of the subset of users.

16. A non-transitory computer-readable medium comprising instructions that, when executed by at least one processor, cause the at least one processor to:
- identify time zones for a set of users associated with a set of client devices in different geographic locations;
- generate chronotypes, utilizing a chronotype machine learning model, for each user within the set of users from extracting data from the set of client devices;
- generate visual representations of the chronotypes for each user within the set of users, wherein the visual representations indicate chronotype patterns for the set of users associated with the set of client devices;
- provide, for display within a scheduling interface presented on a scheduling application of a client device, a scheduling timeline for each user of the set of users, a corresponding time zone and a visual representation with a chronotype pattern of each user of the set of users;
- based on receiving a user interaction within the scheduling interface, generate a calendar event request for a subset of users from the set of users; and
- in response to the calendar event request, generate, utilizing an auto-scheduling machine learning model to process the time zones and the chronotypes for each user within the subset of users, a calendar event for the subset of users from the set of users without navigating to another interface.

17. The non-transitory computer-readable medium of claim 16, further comprising instructions that, when executed by the at least one processor, cause the at least one processor to:
- identify topics corresponding with the calendar event;
- determine a briefing overview based on the identified topics; and
- provide the briefing overview within the scheduling interface presented on the client device.

18. The non-transitory computer-readable medium of claim 16, further comprising instructions that, when executed by the at least one processor, cause the at least one processor to generate calendar events utilizing the auto-scheduling machine learning model that has been trained on at least one of previous meetings, user availability within the set of users, chronotypes, task types, or topics.

19. The non-transitory computer-readable medium of claim 16, further comprising instructions that, when executed by the at least one processor, cause the at least one processor to resolve calendar event conflicts based on user availability and chronotypes corresponding to the subset of users.

20. The non-transitory computer-readable medium of claim 16, further comprising instructions that, when executed by the at least one processor, cause the at least one processor to determine chronotypes for each user by receiving as inputs via a chronotype machine learning model at least one of: individual user responses to questionnaires, a collaboration history, individual user work times corresponding with work categories, or historical productivity measures.

* * * * *